(12) United States Patent
Sjostedt et al.

(10) Patent No.: US 8,382,532 B2
(45) Date of Patent: Feb. 26, 2013

(54) INSERT ELEMENT ENGAGING A CANTED COIL SPRING DISPOSED IN A GROOVE IN A BORE FORMED BY TWO HOUSING PARTS

(75) Inventors: Rob Sjostedt, Foothill Ranch, CA (US); Hugh Cook, Foothill Ranch, CA (US); Farshid Dilmaghanian, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 42 days.

(21) Appl. No.: 13/105,628

(22) Filed: May 11, 2011

(65) Prior Publication Data

US 2011/0280653 A1 Nov. 17, 2011

Related U.S. Application Data

(60) Provisional application No. 61/334,292, filed on May 13, 2010, provisional application No. 61/350,636, filed on Jun. 2, 2010, provisional application No. 61/366,496, filed on Jul. 21, 2010.

(51) Int. Cl.
 *H01R 4/48* (2006.01)
(52) U.S. Cl. ........................................ 439/817
(58) Field of Classification Search .............. 439/349, 439/352, 817; 29/458, 521, 825
See application file for complete search history.

(56) References Cited

U.S. PATENT DOCUMENTS

| | | | |
|---|---|---|---|
| 2,538,683 A | 1/1951 | Guiler | |
| 2,797,937 A | 7/1957 | Frishof | |
| 3,087,038 A | 4/1963 | Bethke | |
| 4,632,434 A | 12/1986 | Proctor | |
| 4,655,462 A * | 4/1987 | Balsells | ........................ 267/167 |
| 4,678,210 A | 7/1987 | Balsells | |
| 4,763,683 A | 8/1988 | Carmack | |
| 4,804,290 A | 2/1989 | Balsells | |
| 4,934,366 A | 6/1990 | Truex et al. | |
| 5,082,390 A | 1/1992 | Balsells | |
| 5,108,078 A | 4/1992 | Balsells | |
| 5,139,276 A | 8/1992 | Balsells | |
| 5,411,348 A | 5/1995 | Balsells | |
| 5,545,842 A | 8/1996 | Balsells | |
| 5,727,821 A | 3/1998 | Miller | |
| 6,430,442 B1 | 8/2002 | Peters et al. | |
| 6,835,084 B2 * | 12/2004 | Poon et al. | ..................... 439/349 |
| 6,895,276 B2 | 5/2005 | Kast et al. | |
| 7,601,033 B2 | 10/2009 | Ries et al. | |
| 2008/0246231 A1 | 10/2008 | Sjostedt et al. | |
| 2009/0048638 A1 | 2/2009 | Rey et al. | |
| 2010/0279558 A1 * | 11/2010 | Leon et al. | ..................... 439/817 |
| 2011/0059639 A1 | 3/2011 | Dilmaghanian et al. | |
| 2012/0208407 A1 * | 8/2012 | Leon et al. | ..................... 439/817 |

* cited by examiner

*Primary Examiner* — Chandrika Prasad
(74) *Attorney, Agent, or Firm* — Klein, O'Neill & Singh, LLP

(57) ABSTRACT

A connector includes a canted coil spring, a multi-piece housing, and an insert element. The multi-piece housing includes a first housing part defining a bore of the housing, and a second housing part connected to the first housing part and comprising a tapered wall defined by a first section of the second housing part with a first inner diameter and a second section of the second housing part with a second inner diameter greater than the first inner diameter. A groove is formed in the bore by the connection of the first housing part with the second housing part, the groove having at least a portion of the canted coil spring disposed therein and having a tapered side wall formed at least partly by the tapered wall of the second housing part. The insert element is insertable into the bore to engage the canted coil spring for connection with the housing.

41 Claims, 13 Drawing Sheets

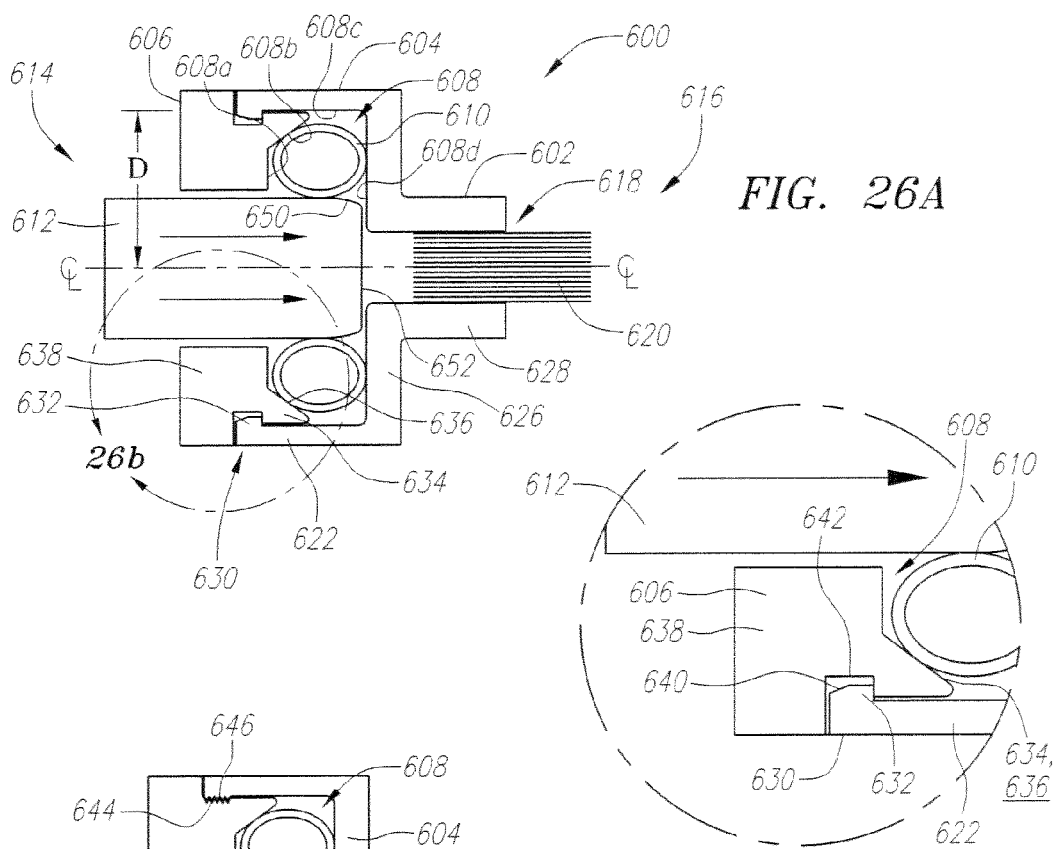
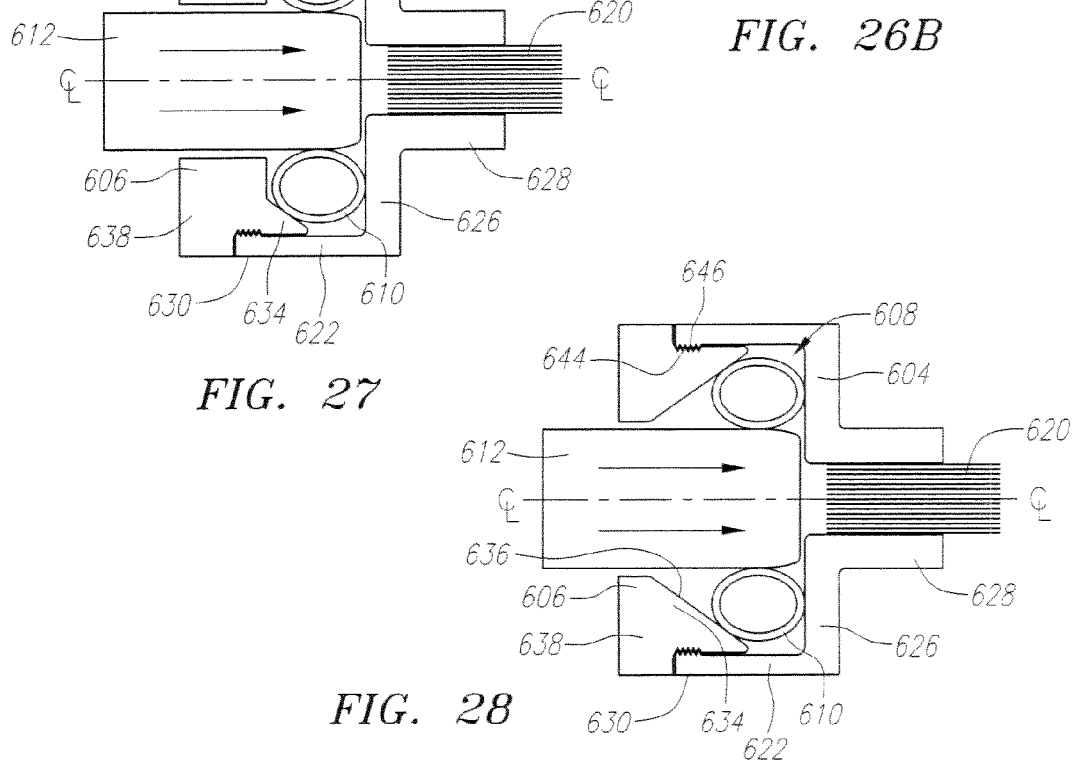
FIG. 26A
FIG. 26B
FIG. 27
FIG. 28

US 8,382,532 B2

INSERT ELEMENT ENGAGING A CANTED COIL SPRING DISPOSED IN A GROOVE IN A BORE FORMED BY TWO HOUSING PARTS

CROSS-REFERENCE TO RELATED APPLICATIONS

The present application claims the benefit of the filing date of U.S. Provisional Application Ser. No. 61/334,292, filed May 13, 2010; U.S. Provisional Application Ser. No. 61/350, 636, filed Jun. 2, 2010; and U.S. Provisional Application Ser. No. 61/366,496, filed Jul. 21, 2010, the entire contents of each of which are expressly incorporated herein by reference.

BACKGROUND

The present application generally relates to spring sockets, and more particularly, to a multi-piece canted coil spring socket.

With canted coil spring connectors or sockets that use a one-piece housing, the canted coil spring must be inserted into a groove in the housing through an open end of the socket. The inside opening diameter of the socket must be made larger than preferred in order to facilitate insertion of the spring. This results in greater exposure of the spring and possible damage to the spring when the male pin of the latching, locking, holding or electrical contact assembly is inserted into the socket.

When cladding or plating canted coil spring connectors or sockets that use a one-piece housing, the process generally requires adding or building up of the surfaces of the groove with cladding or plating metals in order to get sufficient build-up of the cladding layer on the inside surfaces of the groove. For example, in many smaller sized socket assemblies for electrical contact applications, three times as much silver plating may be necessary on the outside non-critical surfaces of the socket in order to achieve the desired plating thickness on the inside of the socket. This issue is not limited to silver plating but common to typical electro-plating processes.

SUMMARY

According to aspects of the disclosure, a connector includes a canted coil spring, a multi-piece housing, and an insert element. The multi-piece housing includes a first housing part substantially defining a bore of the housing, and a second housing part connected to the first housing part and comprising a tapered wall defined by a first section of the second housing part with a first inner diameter and a second section of the second housing part with a second inner diameter greater than the first inner diameter. A groove is formed in the bore by the connection of the first housing part with the second housing part, the groove having at least a portion of the canted coil spring disposed therein and having a tapered side wall formed at least partly by the tapered wall of the second housing part. The insert element is insertable into the bore to engage the canted coil spring for connection with the housing.

The first housing part may include a first section with a first inner diameter and a second section with a second inner diameter greater than the first inner diameter to define a tapered wall of the first housing part, the groove having another tapered side wall formed at least partly by the tapered wall of the first housing part.

The groove may include a flat bottom at least partly formed by the second section of the first housing part.

The groove may include a flat bottom at east partly formed by the second section of the second housing part.

At least a portion of the groove and at least a portion of the insert element contacting the canted coil spring may be electrically conductive, and the canted coil spring may electrically connect the housing with the insert element.

The insert element may include a groove configured to receive at least a portion of the canted coil spring.

According to aspects of the disclosure, a connector includes a canted coil spring, a multi-piece housing, and an insert element. The multi-piece housing includes a first housing part, and a second housing part connected to the first housing part without being press fit to the first housing part, the first housing part and the second housing part defining a bore. A groove is formed in the bore by the connection of the first housing part with the second housing part and having at least a portion of the canted coil spring disposed therein. The insert element is insertable into the bore to contact the canted coil spring for connection with the housing.

At least a portion of the groove and at least a portion of the insert element contacting the canted coil spring may be electrically conductive, and the canted coil spring may electrically connect the housing with the insert element.

The insert element may include a groove con red to receive at least a portion of the canted coil spring.

The housing parts may be connected together by bending a portion of the first housing part to engage an exterior surface of the second housing part or by bending a portion of the second housing part to engage an exterior surface of the first housing part.

The housing parts may be connected together by welding.

The housing parts may be connected together by a projection of the first housing part or the second housing part engaging a depression of the other housing part.

The housing parts may be connected together by a threaded section of the first housing part engaging a threaded section of the second housing part.

The first housing part or the second housing part may be an insert element having a flange and an active end.

According to aspects of the disclosure, a method for assembling a connector includes connecting a first housing part and a second housing part together by mechanically inter-engaging at least one part of the first housing part to at least one part of the second housing part, the connecting of the first housing part and the second housing part forming a bore and a groove in the bore, placing at least a portion of a canted coil spring into groove, and inserting an insert element into the bore, the insert element contacting the canted coil spring to connect to the housing.

The method may include coating the first housing part, the second housing part, or both the first and the second housing parts with a conductive material before mechanically engaging the first and the second housing parts together.

Connecting the housing parts may include bending a portion of the first housing part to engage an exterior surface of the second housing part or bending a portion of the second housing part to engage an exterior surface of the first housing part.

The first housing part, the second housing part, or both the first and the second housing parts may include a wire terminal.

Connecting the housing parts may include a projection of the first housing part or the second housing part engaging a depression of the other housing part.

Connecting the housing parts may include connecting a threaded section of the first housing part to a threaded section of the second housing part.

BRIEF DESCRIPTION OF THE DRAWINGS

FIG. 26A illustrates a cross-sectional view of a two-piece canted coil spring socket according an exemplary embodiment.

FIG. 26B illustrates an enlarged view of area B of FIG. 26A.

FIG. 27 illustrates a cross-sectional view of a two-piece canted coil spring socket according an exemplary embodiment.

FIG. 28 illustrates a cross-sectional view of a two-piece canted coil spring socket according an exemplary embodiment.

DETAILED DESCRIPTION

Aspects of the present device, system, and method are directed to a socket for capturing a canted coil spring, such as a housing having a groove for holding a canted coil spring for mechanical connections and/or electrical contact applications. Exemplary embodiments of the present device, system, and method include a multi-component housing having a groove formed from at least two separately formed and subsequently attached housing components.

Figure 1:
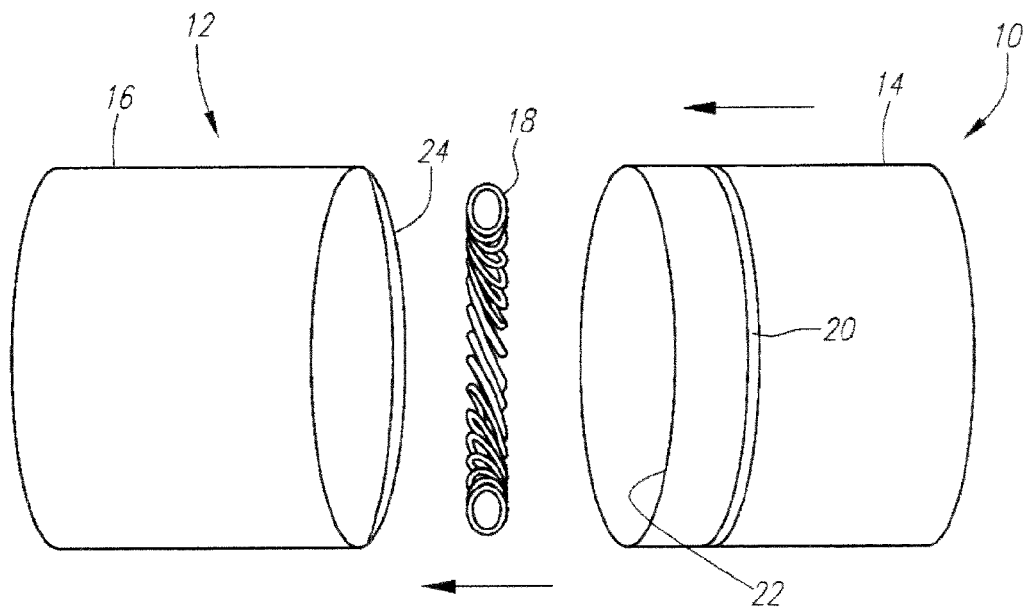
FIG. 1 illustrates a perspective view of two-piece canted coil spring socket before assembly according an exemplary embodiment.

With reference to FIG. 1, a multi-piece or multi-component canted coil spring socket 10 is shown comprising a two piece housing 12, which includes a first housing section 14 and a second housing section 16, and a spring 18. The spring 18 may be a canted coil spring, such as a garter-type radial or axial canted coil spring. In FIG. 1, an axial canted coil spring is shown. Exemplary springs are shown in U.S. Pat. Nos.

4,655,462; 4,826,144; 4,876,781; 7,907,788; 5,160,122; 5,503,375; 5,615,870; and 5,791,638 and in co-pending application Ser. Nos. 12/102,626, filed Apr. 14, 2008 and 12/767,421, filed Apr. 26, 2010. The contents of the foregoing patents and applications are expressly incorporated herein by reference. As used herein, the terms "first" and "second" are meant to designate between two different housing sections only but otherwise do not distinguish them by structure or feature unless noted otherwise. Also as used herein, the term "inter-engaging" means providing a physical barrier between two or more objects during mechanical engagement that is more than friction or press fit.

In one example, the first housing section 14 is made from a conductive metal cylindrical section comprising a wall surface having an inside diameter and an outside diameter, which defines a wall thickness there between. A latching outer or exterior groove 20 is incorporated near an active end wall 22, which forms part of a completed groove, as further discussed below. The latching outer groove 20 and the active end wall may be made using several conventional methods, such as machining, casting, etc. The groove 20 may embody a number of different groove configurations, as further discussed below. As used herein, conductive metal means any metal capable of conducting current, such as steel, stainless steel, copper, and gold. In certain embodiments, a preferred conductive metal, such as copper, copper alloy, or a preferred combination, such as copper with silver or other noble metal cladding, may be specified.

The second housing section 16 is made from a conductive metal cylindrical section comprising a wall surface having an inside diameter and an outside diameter, which defines a wall thickness there between. An active end wall 24 is incorporated for mating engagement with the exterior groove 20, as further discussed below.

Figure 2:
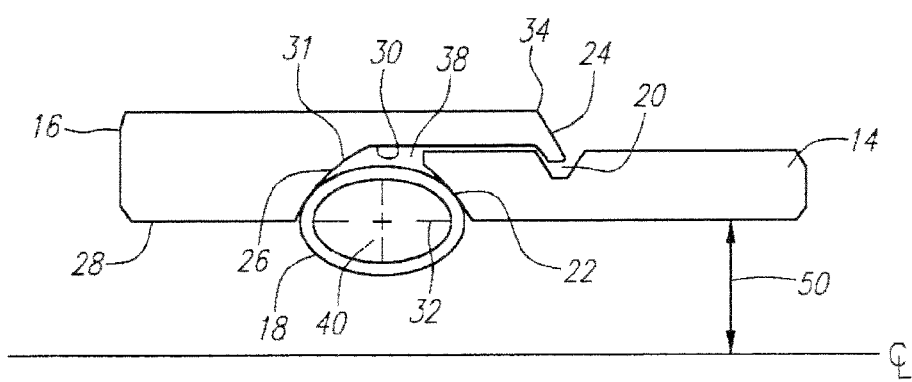
FIG. 2 illustrates a cross-sectional view of the two-piece canted coil spring socket of FIG. 1 when assembled.

FIG. 2 is a partial cross-sectional side view of the assembly of FIG. 1 in the assembled state. With reference to FIG. 2 in addition to FIG. 1, a tapered wall surface or shoulder 26 is incorporated on the interior wall surface 28 of the second housing section 16. The tapered wall surface 26 may have a single angle or made of a complex or compound wall surface that includes multiple angled surfaces. The tapered wall surface 26 extends into a bottom groove surface 30, which is preferably flat and extended. In other words, compared to the major axis 32 of the canted coil spring 18, which is shown in this configuration as a radial canted coil spring, the bottom groove surface 30 is preferably 130% or greater, such as 150% to 250% or more. Uniquely, the second housing section does not have an opposed tapered wall surface for forming the companion sidewall of a standard groove, which typically comprises a groove bottom and two sidewalls. Thus, the present configuration may be referred to as a partial housing groove or not a complete groove 31. As shown, the bottom groove surface 30 extends into a generally flat cylinder end 34. Upon assembly with the first housing section 14 as shown in FIG. 2, the flat cylinder end 34 is crimped to form the bent active end wall or lip 24, which engages the exterior groove 20. In another embodiment, the cylinder end wall 34 is formed or fabricated with a lip 24. The lip 24 is configured to press fit over the end wall 36 of the first housing 14 and into engagement with the exterior groove 20. A slip fit of the two hosing components may also be suitable in certain applications wherein one or more socket(s) is molded or fitted into an electrical contact block making a multiple pin/socket connector assembly.

As shown, the completed groove or simply housing groove 38 is formed by a combination of the first housing section 14 and the second housing section 16. The two housing sections are preferably conductive in nature and in one embodiment are plated. For example, the two housing sections may be plated or coated with copper, copper alloys, noble metals, noble metal alloys, aluminum, aluminum alloys, or silver. The spring may alternatively be made from a highly conductive metal such as pure copper and a clad higher strength material, such as stainless steel over the copper. The multi-metal spring may further be plated with a conductive outer coating layer, such as silver. In an embodiment, the groove 38 comprises two tapered sidewalls 22, 26 and a bottom wall 33 that is spaced apart from the canted coil spring 18. In other words, the bottom wall 33 does not contact the spring. In a specific example, at least one of the sidewalls 22 or 26 comprises a complex or compound tapered sidewall, which may be understood to include two or more tapered wall sections or surfaces. The angle of the tapered sidewalls 22, 26 and the use of complex sidewalls allow a designer to control how far the spring sits within the groove 38. In one embodiment, the spring 18 sits in the groove 38 at a depth that is no more than 60% of its minor axis 40. Preferably, the spring sits no more than 40% of its minor axis so that over half of its depth is exposed into the housing bore and away from the groove 38. In another embodiment, the depth is controlled by the spacing between the two sidewalls 22, 26, which may be regulated by the overall housing geometry. For example, the exterior groove 20 may be moved to the left of FIG. 2 to control the sidewall spacing. The length of the bottom wall 30 to the end wall 34 can also determine the sidewall spacing.

In one alternative embodiment, the housing groove 38 is configured so that the spring 18 simultaneously contacts the bottom wall 30 and both sidewalls 22, 26. Furthermore, the spring 18 may be rotated to sit within the groove 38 at a turn angle. For example, when the first housing 14 is pushed into engagement with the second housing 16 with the spring 18 already positioned within the partial groove 31, the active end 22 of the first housing 14 contacts and rotates the spring 18 to an operating turn angle, which can be engineered to turn to a desired or particular turn angle by controlling the geometry of the completed groove.

In another embodiment, the groove is formed from at least three housing sections. For example, a first housing section may form a left sidewall of the completed groove, a second housing section may form a bottom wall of the completed groove, and a third housing section may form the right sidewall of the completed groove. Together, the three housing sections contribute to form the completed groove. The three housing sections may attach to one another by crimping or by simple press fit, as discussed above.

Another embodiment provided herein is a method for assembling a conductive housing groove comprising placing a canted coil spring into a partial groove of a first conductive housing section, the partial groove comprising a tapered sidewall and a bottom wall comprising a flat bottom surface, and inserting a second conductive housing section into an open end of the first conductive housing section so that a tapered active end wall touches the canted coil spring. In another example, the method comprises turning the canted coil spring when inserting the second conductive housing section. In still yet another embodiment, the two housing sections are plated with a material that differs from the first conductive housing section and the second conductive housing section. In yet another embodiment, the method further comprises crimping the end wall of the first conductive housing section so that a lip section of the first conductive housing section engages a groove on the second conductive housing section. Alternatively, a simple press fit may be used to attach the two housing sections together.

As understood herein, the present embodiment may also be used as a connector for latching, locking and/or holding applications either as a mechanical and/or electrical connection with a male pin. Thus, aspects of the present apparatus, system, and method comprise a multi-piece canted coil spring socket in which a housing groove is made from two or more housing sections and wherein a canted coil spring is positioned within the housing groove for use to latch, lock, and/or hold applications to optionally conduct electrical current. The housing material for such latch, lock, and/or hold applications may not have to be conductive and as such can be molded from an engineering plastic rather than machined from metal. For example, the material may be made from PEEK (polyetheretherketone), PEK (polyetherketone), PA (polyamides), PSU (polysuphone), or PET (polyethylene terephthalate). In another embodiment, the first housing component may be made from a polymer plastic and the second housing component can be made from metal thereby reducing cost and still providing for electrical contact between a male pin and the socket assembly.

Refer again to FIG. 2, as shown and understood, the housing 12 comprises a cylinder having a centerline CL, which is spaced from the sidewall by a distance 50. The connector assembly 10 may be placed in service by inserting a pin (not shown) in the direction of the centerline until the pin engages and/or compresses the spring, which provides a biasing force or electrical connection acting between the housing and the pin. The pin may or may not have a pin groove for receiving a portion of the spring. In one embodiment, the distance 50 may be adjusted by increasing or decreasing the diameter of the housing 12. Decreasing the distance 50 can decrease the likelihood of pin misalignment by closing the gap between the interior surface of the housing and the outside surface of the pin. The assembly is especially suited for small connector applications on the order of fractions of an inch. With small connector applications, the ability to slide the canted coil spring into a partial groove and then complete the groove allows for quick and easy assembly.

Figure 3:
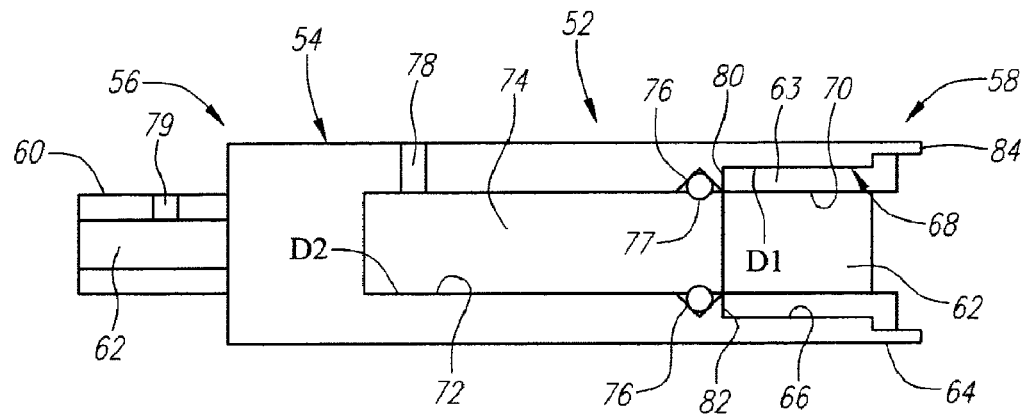
FIG. 3 illustrates a cross-sectional view of a two-piece canted coil spring socket according an exemplary embodiment.

Refer now to FIG. 3, a schematic cross-sectional side view of an alternative connector 52 is shown. The connector 52 may be used for a high-amperage electrical socket application. In other examples, the connector 52 is used for latching, locking, and/or holding applications. As shown, the connector 52 comprises a housing 54 comprising a first end 56 and a second end 58. A wire terminal 60 comprising a bore 62 is located at the first end 56 of the housing for connecting to another structure, such as to a cable, a wire, or a circuit board (not shown). At the second end 58, an enlarged open end 62 comprising an annular skirt 64 is incorporated. The enlarged open end 62 defines an insert pocket 63 comprising a diameter D1 and a length 66 sized to receive an insert element 68, which is separately formed and placed into the insert pocket 63 in a close-fit arrangement, as further discussed below.

In one example, the inside diameter 70 of the insert element 68 is the same or approximately the same as the nominal inside diameter D2 of the housing 54, which are both sized to receive a connecting pin or rod (not shown) to make electrical communication with the connector 52. In another embodiment, the inside diameter 70 of the insert element 68 is slightly smaller than the nominal inside diameter D2 to provide a lip or raised protection area for the spring 77. The housing 54 has an interior wall surface 72 defining a socket 74 sized to receive a pin having a certain depth or length. A spring groove 76 is formed in the interior surface of the housing to receive the canted coil spring 77. As shown, the spring groove 76 is a V-groove. In one example, the spring groove 76 is a completed groove capable of accommodating a canted coil spring and located adjacent an active end 80 of the insert element 68. As used herein, a completed groove is understood to mean a groove that is capable of capturing and retaining a spring. For example, a completed groove can include a bottom groove surface disposed between two sidewalls or two angularly formed sidewalls forming a V-groove. In another example, the spring groove is a partial spring groove requiring completion to form a completed groove. For example, a cylinder end of the insert element 68 may form part of the groove with the partial spring groove formed by the housing 54, as further discussed below.

The housing 54 is configured with the enlarged open end 62 for ease of plating or coating the wall surfaces of the housing. For example, prior to inserting the spring 77 into the spring groove 76 and prior to inserting the insert element 68 into the insert pocket 63, the enlarged open end 62 provides added interior space for plating the interior wall surfaces of the housing by presenting an opening having a diameter equivalent to D1, which is larger than D2. In one example, the relative diameter dimensions is equivalent to about a 5% to about 25% bigger area opening at the second end for accessing and plating the interior surfaces 72.

Another benefit of the present embodiment is the ability to form a completed groove or at least a partial groove at a distance deep into the interior cavity or socket 74 from the end opening 62. In the embodiment shown, this distance is roughly the length of the insert element 68. Again, although the groove 76 is located some distance from the end opening 62 of the housing, the enlarged entrance or opening provides easier access to the groove to properly circulate plating electrolyte and consistent field strength distribution and deposition of electroplating materials. In one embodiment, vent ports 78, 79 are provided on the housing 54 and the wire terminal 60 to facilitate circulating plating materials during the plating process. The enlarged open end 62 also allows for easier insertion of the canted coil spring 77 compared to other connectors having a similar housing and spring location but with a traditional opening, i.e., without using an insert element.

As discussed above, the housing 54, including the wire terminal 60, is preferably made from a conductive material and plated with a second conductive material. For example, the housing and wire terminal may be made from stainless steel and plated or coated with copper, copper alloy, noble metals, noble metal alloy, aluminum, aluminum alloy, silver, or combinations thereof. In other embodiments, the connector is made from a highly conductive material, such as copper or aluminum, and is plated with a high tensile strength material, such as stainless steel. In still yet another embodiment, the housing is practiced without plating or coating the base material that forms the housing.

Figure 4:
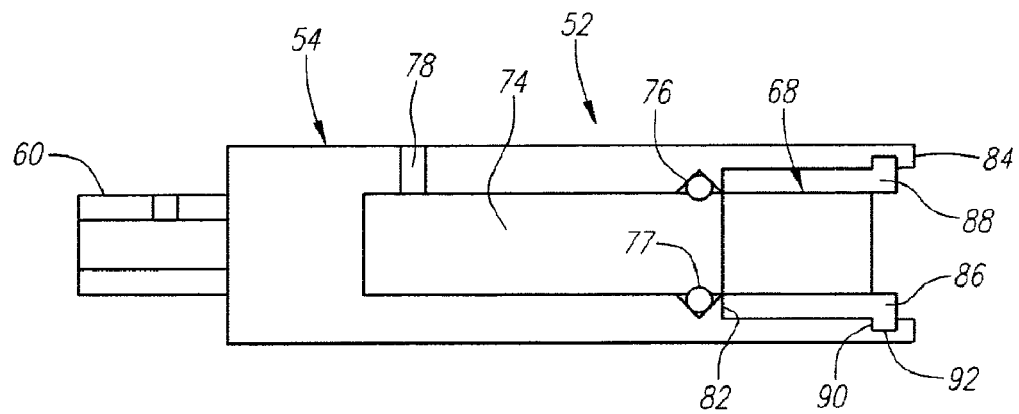
FIG. 4 illustrates a cross-sectional view of a two-piece canted coil spring socket according an exemplary embodiment.

Refer now to FIG. 4 in addition to FIG. 3, in one example, the insert member 68 is inserted into the insert pocket 63 until the active end 80 is stopped by the shoulder 82 formed adjacent the spring groove 76. The insert element 68 is then secured inside the insert pocket 63 by crimping the annular skirt 64. In a specific embodiment, the overhang area 84 of the skirt 84 is folded over the proximal end 86 of the insert element 68 in a fast and inexpensive crimping process. The insert element 68 is shown with a flange 88 at its proximal end 86. Although the insert element can be practiced without the flange 88, the flange 88 provides another abutment surface with a second shoulder 90 at the insert pocket 63 of the housing 54 when incorporated. In a preferred embodiment, the insert element 68 incorporates a flange 88 so that a recess or annular race 92 is formed by the skirt 64 when crimped over the flange. The recess 92 provides a positive stop on the flange in the directions of the first end 56 and the second end 58 so that the active end 80 of the insert element does not necessary have to abut the first shoulder 82. Once the end of the skirt section is crimped, the insert element 68 is completely contained within the housing 54 and is exposed only from the end opening 62 of the housing.

Thus, an aspect of the present device, system, and method may be understood to include an insert element comprising a first end, which may be the active end 80, and a second end, which may be the proximal end 86, wherein the insert element abuts a shoulder on a housing at its first end 80, its second end 86, or both, and wherein the housing is folded over the second end of the insert element 68 in a crimping process. The device, system, and method as described, wherein the insert element is made from a material that differs from the housing. In one example, the insert element is made from a non-conductive material whereas the housing is made from a conductive material.

Figure 5:
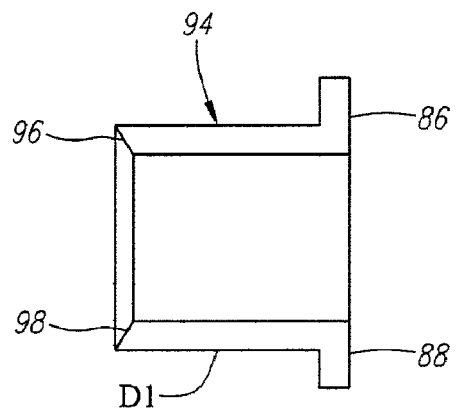
FIG. 5 illustrates a cross-sectional view of one piece of a two-piece canted coil spring socket according to an exemplary embodiment.

Refer now to FIG. 5, an alternative insert element 94 is shown comprising an active end wall 96. Similar to the active end wall discussed above for the two-part housing of FIGS. 1 and 2, the present active end wall 96 may be incorporated to form part of a spring groove. For example, the housing 54 may incorporate a partial spring groove comprising a single side wall and a bottom wall. The tapered surface 98 of the active end wall 96 therefore complements the partial spring grove to form a completed groove comprising two sidewalls and a bottom wall. The geometry of the groove may be configured so that a canted coil spring placed there is rotated to a desired turn angle upon insertion of the insert element into the insert pocket. The present active end wall 96 may also join another angled shoulder formed in the interior surface of the housing 54 to form a completed V-groove.

In one embodiment, the insert elements 68, 94 of FIGS. 3 and 5 are made from a conductive material. For example, the insert elements 68, 94 may be made from the same material as the housing 54 and coated with the same conductive outer material. In another embodiment, the insert elements 68, 94 are not coated with an outer conductive layer. In yet another embodiment, the insert elements are made from a non-conductive material, such as from a thermoplastic material or from an engineered plastic material. By forming the insert elements 68, 94 from a non-conductive material, the overall costs for making a connector can be reduced as compared to making both the housing and the insert element from a conductive material.

Figure 6:
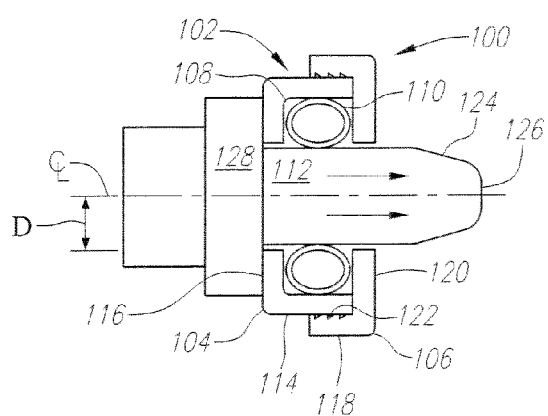
FIG. 6 illustrates a cross-sectional view of a two-piece canted coil spring socket according an exemplary embodiment.

FIG. 6 illustrates a multi-piece or multi-component canted coil spring socket 100 comprising a two piece collar 102. The collar 102 includes a first collar section 104 and a second collar section 106. The collar sections 104, 106 form a groove 108 that receives a spring 110. The spring 110 may be, for example, a canted coil spring 110, such as a garter-type radial or axial canted coil spring 110. Further, the geometry of the groove 108 may be engineered so that the spring 110 includes a turn angle (not shown). The spring socket 100 is configured to receive a male pin 112 such that the pin 112 contacts the spring 110 in a latching, locking, holding or electrical contact type of engagement.

The first collar section 104 includes an annular outer wall 114 and a flange 116 that extends radially inward from a first end of the outer wall 114. The second collar section 106 similarly includes an annular outer wall 118 and a flange 120 that extends radially inward from a first end of the outer wall 118. An inner diameter of the second outer wall 118 is approximately equal to an outer diameter of the first outer wall 114. The second collar section 106 receives the first collar section 104 with the second outer wall 118 overlapping the first outer wall 114, and the flanges 116, 120 spaced from one another. The spaced flanges 116, 120 form sidewalls of the groove 108, with the first outer wall 114 forming a bottom wall or floor of the groove 108. The groove 108 thus has a flat bottom. In alternative embodiments, the groove 108 may have any of the geometries described above with respect to the grooves 38, 76. The two piece collar 102 is therefore understood to form a spring groove by incorporating two collar sections 104, 106 each comprising a side wall.

The first and second collar sections 104, 106 may be pressed fit together. In the illustrated embodiment, the inner surface of the second outer wall 118 includes ratchet teeth 122. The teeth 122 are oriented such that they do not provide substantial resistance as the collar sections 104, 106 are assembled to one another, but do resist separation of the collar sections 104, 106 from one another. In certain embodiments, the collar sections 104, 106 may comprise an interference fit, which enhances the holding power of the ratchet teeth 122.

In the illustrated embodiment, the male pin 112 includes a smooth cylindrical outer surface with a tapered nose 124 that terminates in a flat leading end 126. The tapered nose 124 decreases the insertion force required to insert the pin 112 into the collar 102. In alternative embodiments, as discussed below, the pin 112 may include a groove that receives the spring 110. A transverse disk-shaped portion 128, coaxial with the cylindrical portion, includes a larger diameter than the cylindrical portion. The disk-shaped portion 128 thus provides an annular shoulder 130 that abuts the first flange 116 to limit the extent to which the pin 112 may be inserted into the spring socket 100. The position of the disk-shaped portion 128 along the pin may be adjusted to vary the extent of insertion.

As shown, the completed groove 108 is formed by a combination of the first collar section 104 and the second collar section 106. In one embodiment, the two collar sections 104, 106 comprise electrically conductive materials. The collar sections 104, 106 may, for example, comprise any of the materials described above with respect to the housing sections 14, 16 and/or the housing 54 and the insert element 68. In other embodiments, the first collar section 104 may comprise a metal while the second collar section 106 may comprise a plastic. Example materials for the plastic second section 106 include engineered plastic, such as PEEK. In other embodiments, both the first and second collar sections 104, 106 may comprise a plastic. The spring 110 may, for example, comprise any of the materials described above with respect to the springs 18, 77.

Another embodiment provided herein is a method for assembling a collar groove 108. The method comprises placing a canted coil spring 110 into a partial groove of a first collar section 104. The partial groove comprises a first groove sidewall 116 and a groove floor 114. The method further comprises assembling a second collar section 106 to the first collar section 104 so that the second collar section 106 forms a second groove sidewall 120 spaced from the first groove sidewall 116 with the canted coil spring 110 disposed within the groove 108. In another embodiment, the method comprises turning the canted coil spring 110 when assembling the second collar section 106 to the first collar section 104. In still yet another embodiment, the two collar sections 104, 106 are plated with a material that differs from the material of the first collar section 104 and the second collar section 106. Thus, the two-piece collar 102 or at least one of the collars, such as the one in contact with the canted coil spring, is made of multi-material. The multi-material can include combinations discussed above.

As understood herein, the above-described multi-piece or multi-component canted coil spring socket 100 comprising a two piece collar 102 may be used as a connector for latching, locking and/or holding applications either as a mechanical and/or electrical connection with a male pin 112. Thus, aspects of the present apparatus, system, and method comprise a multi-piece canted coil spring socket 100 in which a collar groove 108 is made from two or more collar sections 104, 106 and wherein a canted coil spring 110 is positioned within the collar groove 108 for use to latch, lock, and/or hold and/or conduct electrical current. The collar material for such latch, lock, and/or hold applications may not have to be conductive and as such can be molded from an engineering plastic rather than machined from metal. Molded plastics are generally less expensive to produce than machined metals. Plastic embodiments thus reduce costs. In another embodiment, the first collar section 104 may be made from a metal and the second collar section 106 can be made from a plastic, thereby reducing cost and still providing for electrical contact between a male pin 112 and the socket assembly 100.

Referring again to FIG. 6, as shown and understood, the two-piece collar 102 defines a centerline CL which is spaced from inner surfaces of the collar sections 104, 106 by a distance D. The socket assembly 100 may be placed in service by inserting the pin 112 in the direction of the centerline CL, as shown by the arrows, until the pin 112 engages and/or compresses the spring 110. The spring 110 provides a biasing force and/or electrical connection acting between the collar 102 and the pin 112. The pin 112 may or may not have a pin groove (not shown) for receiving a portion of the spring 110. In one embodiment, the distance D may be adjusted by increasing or decreasing the diameter of the collar 102. Decreasing the distance D can decrease the likelihood of pin 112 misalignment by closing the gap between the sidewalls of the groove 108 and the outside surface of the pin 112. The socket assembly 100 is especially suited for small connector applications on the order of fractions of an inch. With small connector applications, the ability to slide the canted coil spring 110 into a partial groove and then complete the groove 108 allows for quick and easy assembly.

FIGS. 7-17 illustrate additional embodiments of the present multi-piece or multi-component canted coil spring socket comprising a two piece collar. The embodiments of FIGS. 7-17 are similar in many respects to the embodiment of FIG. 6 in terms of structure, material properties and functionality. Accordingly, the descriptions below focus on the differences between the embodiment of FIG. 6 and the embodiments of FIGS. 7-17. Where a particular aspect of one of the following embodiments is not explained in detail, it should be assumed that that aspect is similar to the corresponding aspect of the embodiment of FIG. 6.

Figure 7:
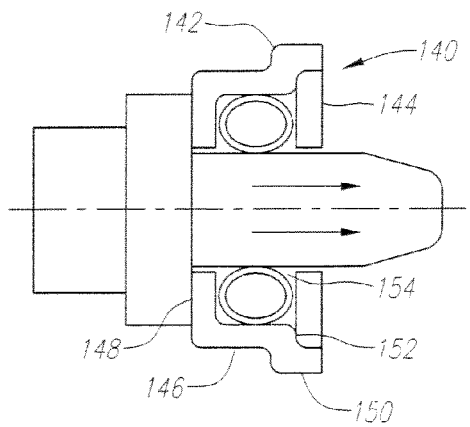
FIG. 7 illustrates a cross-sectional view of a two-piece canted coil spring socket according an exemplary embodiment.

With reference to FIG. 7, the collar 140 includes a first collar section 142 and a second collar section 144. The first collar section 142 includes an annular outer wall 146 and a flange 148 that extends radially inward from a first end of the outer wall 146. The first collar section 142 further includes a skirt section 150 that extends from the outer wall 146. The skirt section 150 extends axially away from the flange 148 in a plane that is positioned radially outward from a plane defined by the outer wall 146. A junction of the outer wall 146 and the skirt 150 forms an annular shoulder 152 that faces away from the flange 148. The second collar section 144 is a flat annular ring, or washer. An outer diameter of the second collar section 144 is approximately equal to an inner diameter of the skirt 150. The second collar section 144 thus seats within the space bounded by the annular shoulder 152 and the skirt 150. The flange 148 forms a first sidewall of the groove 154, and the outer wall 146 forms a floor of the groove 154. The second collar section 144, which is spaced from the flange 148 by the outer wall 146, forms a second sidewall of the groove 154. The groove 154 has a flat bottom. In alternative embodiments, the groove 154 may have any of the geometries described above with respect to the grooves 38, 76.

The first and second collar sections 142, 144 may be press fit together. For example, the outer diameter of the second collar section 144 and the inner diameter of the skirt 150 may comprise an interference fit. Alternatively, or in addition, the first and second collar sections 142, 144 may be held together by a weld, adhesive, etc.

Figure 8:
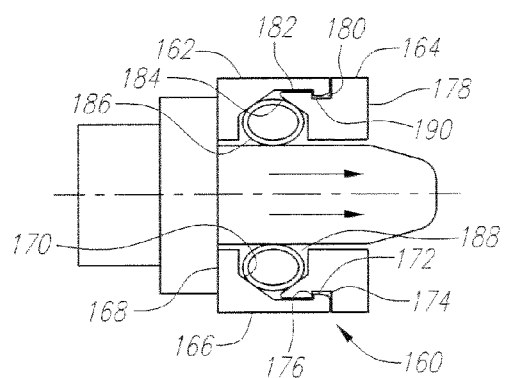
FIG. 8 illustrates a cross-sectional view of a two-piece canted coil spring socket according an exemplary embodiment.

With reference to FIG. 8, the collar 160 includes a first collar section 162 and a second collar section 164. The first collar section 162 includes an annular outer wall 166 and a flange 168 that extends radially inward from a first end of the outer wall 166. The first collar section 162 further includes a wall section 170 that loins the inner surfaces of the outer wall 166 and the flange 168. The wall section 170 forms an angle of approximately 50° with the outer wall 166 and an angle of approximately 40° with the flange 168. However, in alternative embodiments the wall section 170 may extend at any angle. The first collar section 162 further includes a tab 172 that extends radially inward a short distance at the second end of the outer wall 166. The tab 172 includes a tapered surface 174 that faces radially inward and axially away from the flange 168. An inner face 176 of the tab 172 extends radially.

The second collar section 164 includes a main body portion 178 that is shaped in cross-section as a rectangle having a rectangular shaped corner section 180 removed. Adjacent the removed section 180, a ramp portion 182 extends toward the first collar section 162. The ramp portion 182 is shaped as a right triangle in cross-section, with the hypotenuse forming a ramped surface 184 that faces the spring 186. Together, the wall section 170 of the first collar section 162 and the ramped surface 184 of the second collar section 164 form a V-shaped bottom of the groove 188. Portions of the flange 168 and the main body portion 178 form sidewalls of the groove 188.

The second collar section 164 further includes a recess 190 bounded by the ramp portion 182 and the walls of the removed section 180 of the main body portion 178. The recess 190 receives the tab 172 of the first collar section 162 in mating engagement to secure the two collar sections 162, 164 together. The collar sections 162, 164 may, for example, be press fit together. During assembly, the tapered surface of the tab 172 bears against the ramp portion 182 to enable the outer wall 166 to flex radially outward. The flexed outer wall 166 temporarily widens the diameter of the first collar section 162 as measured between the tabs 172. The wider diameter accommodates the passage of the ramp portion 182 until the tab 172 reaches the recess 190, at which point it snaps into place to secure the collar 160 sections together.

Figure 9:
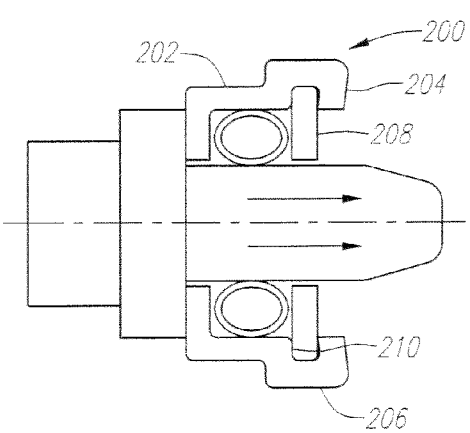
FIG. 9 illustrates a cross-sectional view of a two-piece canted coil spring socket according an exemplary embodiment.

With reference to FIG. 9, the collar 200 is similar to the collar 140 of FIG. 7, except that the first collar section 202 includes a retention tab 204 that extends radially inward from an end of the skirt 206. The retention tab 204 extends around the edge of the second collar section 208 to secure the collar sections 202, 208 together. The retention tab 204 may, for example, comprise an extension of the skirt 206 that is crimped to bend around the second collar section 208 after the second collar section 208 is seated against the annular shoulder 210.

Figure 10:
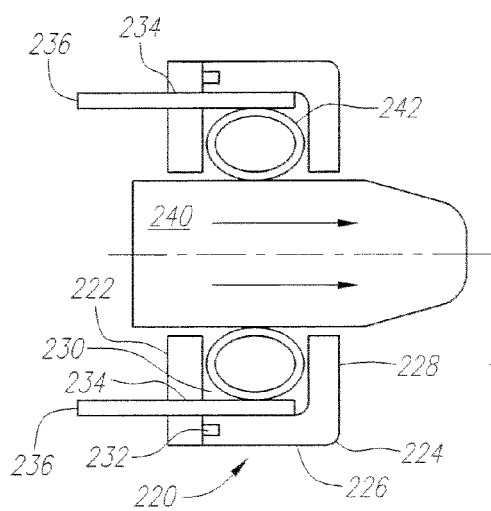
FIG. 10 illustrates a cross-sectional view of a two-piece canted coil spring socket according an exemplary embodiment.

With reference to FIG. 10, the collar 220 includes a first collar section 222 and a second collar section 224. The first collar section 222 is a flat annular ring, or washer. The second collar section 224 includes an annular outer wall 226 and a flange 228 that extends radially inward from a first end of the outer wall 226. The first collar section 222 abuts an end of the outer wall 226 opposite the flange 228. The first collar section 222 is thus spaced from the flange 228 such that the flange 228 and the first collar section 222 form sidewalls of the groove 230. The first and second collar sections 222, 224 may be secured to one another with adhesive, welding, etc. Alternatively, or in addition, fastening members may secure the collar sections 222, 224 to one another. In the illustrated embodiment, an end of the outer wall 226 that abuts the first collar section 222 includes openings 234 232 for receiving fastening members (not shown).

The first collar section 222 includes first and second radially opposed openings 234. The openings 234, which may be rectangular or arcuate when viewed in the axial direction, receive spaced sheet portions 236. The sheet portions 236 extend longitudinally and abut the inner surface of the outer wall 226. The sheet portions 236 form the bottom of the groove 230, which in the illustrated embodiment includes a flat bottom. In alternative embodiments, the first collar section 222 may include additional circumferentially spaced openings 234 that receive additional sheet portions 236. In one embodiment, the first and second collar sections 222, 224 may comprise plastics, while the sheet portions 236 comprise an electrically conductive metal. Current thus passes between the sheet portions 236 and the pin 240 through the spring 242. The two sheet portions 236 may be coupled to one another, such as by a common backing plate or flange resembling a partial cylinder or bracket, or completely spaced apart.

Figure 11:
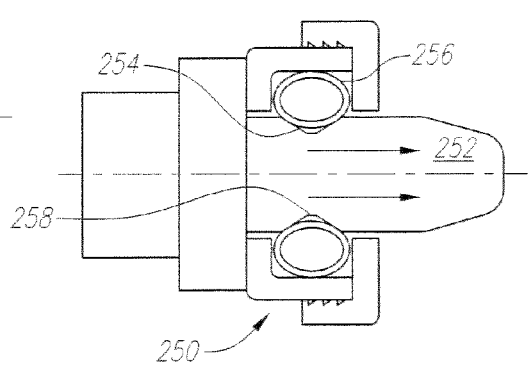
FIG. 11 illustrates a cross-sectional view of a two-piece canted coil spring socket according an exemplary embodiment.

With reference to FIG. 11, the collar 250 is similar to the collar 100 of FIG. 6. However, the pin 252 includes a groove 254 that receives the spring 256. In the illustrated embodiment, the pin groove is substantially V-shaped, but includes a short flat bottom 258. In alternative embodiments, the pin groove 254 could have any shape, such as the shapes of the grooves 108, 188 shown in FIGS. 6 and 8.

Figures 12, 13:
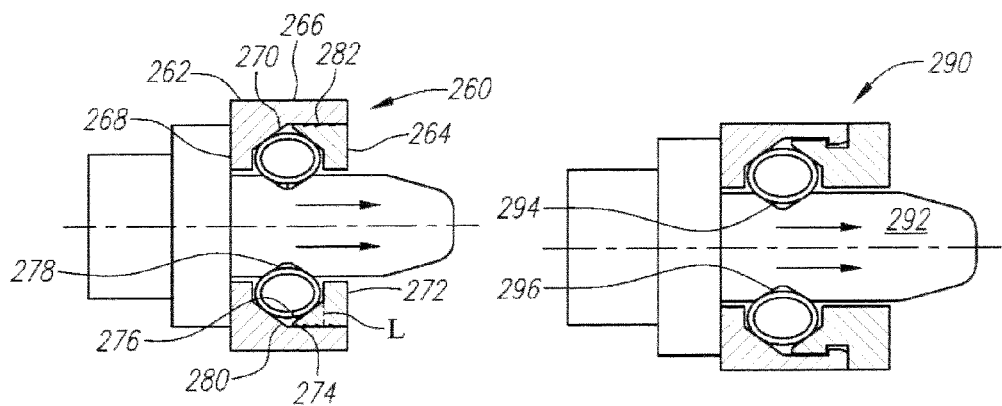
FIG. 12 illustrates a cross-sectional view of a two-piece canted coil spring socket according an exemplary embodiment.
FIG. 13 illustrates a cross-sectional view of a two-piece canted coil spring socket according an exemplary embodiment.

With reference to FIG. 12, the collar 260 includes a first collar section 262 and a second collar section 264. The first collar section 262 includes an annular outer wall 266 and a flange 268 that extends radially inward from a first end of the outer wall 266. The first collar section 262 further includes a wall section 270 that joins the inner surfaces of the outer wall 266 and the flange 268. The wall section 270 forms an angle of approximately 50° with the outer wall 266 and an angle of approximately 40° with the flange 268. However, in alternative embodiments the wall section 270 may extend at any angle.

The second collar section 264 includes a main body portion that is shaped in cross-section as a rectangle 272 adjoining a triangle 274. The demarcation between the rectangular section 272 and the triangular section 274 is shown by the dashed line L. The triangular section 274 includes a ramped surface 276 that faces the spring 278. Together, the wall section 270 of the first collar section 262 and the ramped surface 276 of the second collar section 264 form a V-shaped bottom of the groove 280. Portions of the flange 268 and the rectangular section 272 form sidewalls of the groove 280.

An inner diameter of the outer wall 266 is approximately equal to an outer diameter of the second collar section 264. The first collar section 262 receives the second collar section 264 with the outer wall 266 overlapping the second collar section 264, and the flange 268 spaced from the rectangular section 272. The first and second collar sections 262, 264 may be press fit together. In the illustrated embodiment, the outer surface of the second collar section 264 includes ratchet teeth 282. The teeth 282 are oriented such that they do not provide substantial resistance as the collar sections 262, 264 are assembled to one another, but do resist separation of the collar sections 262, 264 from one another. In certain embodiments, the collar sections 262, 264 may comprise an interference fit, which enhances the holding power of the ratchet teeth 282.

With reference to FIG. 13, the collar 290 is similar to the collar 160 of FIG. 8. However, the pin 292 includes a groove 294 that receives the spring 296. In the illustrated embodiment, the pin groove 294 is shaped similarly to the pin groove 254 of FIG. 11. In alternative embodiments, the pin groove 294 could have any shape, such as the shapes of the grooves 108, 188 shown in FIGS. 6 and 8.

Figures 14, 15:
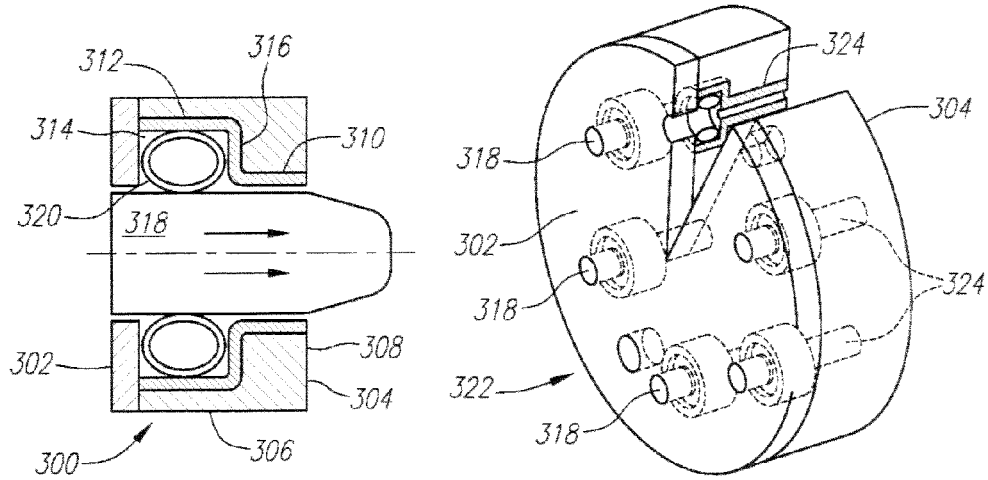
FIG. 14 illustrates a cross-sectional view of a two-piece canted coil spring socket according, an exemplary embodiment.
FIG. 15 illustrates a perspective view of a disk-shaped connector using two-piece canted coil spring sockets according to the embodiment of FIG. 14.

With reference to FIG. 14, the collar 300 includes a first collar section 302 and a second collar section 304. The first collar section 302 is a flat annular ring, or washer. The second collar section 304 includes an annular outer wall 306 and a flange 308 that extends radially inward from a first end of the outer wall 306. The flange 308 is spaced from the first collar section 302. The first collar section 302 abuts an end of the outer wall 306 opposite the flange 308. The first and second collar sections 302, 304 may, for example, be secured to one another with adhesive, welding, etc.

The second collar section 304 further includes a lining 310 that covers the inward facing surfaces of the outer wall 306 and the flange 308. The portion 312 of the lining 310 that covers the inward facing surface of the outer wall 306 forms a flat bottom of the groove 314. The first collar section 302 and the portion 316 of the lining 310 that covers the inward facing surface of the flange 308 form sidewalls of the groove 314.

In certain embodiments, the first and second collar sections 302, 304 may comprise plastic, while the lining 310 comprises metal. Current thus passes between the lining 310 and the pin 318 through the spring 320.

With reference to FIG. 15, in one embodiment the apparatus of FIG. 14 may comprise or use as part of a section of a disk-shaped connector 322. The connector 322 includes the first and second collar sections 302, 304, which are both shaped substantially as disks having a plurality of circumferentially spaced openings 324. Each of the openings 324 includes the cross-sectional configuration shown in FIG. 14, and each receives a pin 318 as shown in FIG. 14. The connector 322 may embody a female connector comprising a plurality of conductive receptacles for receiving a male plug comprising a plurality of male pins 318. As shown, the connector 322 is configured to receive six pins 318. In other embodiments, the connector 322 is configured to receive a different number of pins, such as less than or more than six.

Figures 16, 17:
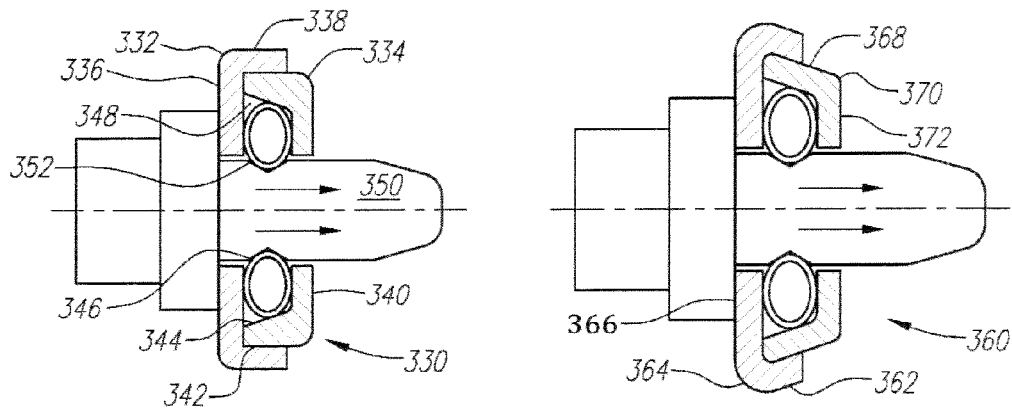
FIG. 16 illustrates a cross-sectional view of a two-piece canted coil spring socket according an exemplary embodiment.
FIG. 17 illustrates a cross-sectional view of a two-piece canted coil spring socket according an exemplary embodiment.

With reference to FIG. 16, the collar 330 includes a first collar section 332 and a second collar section 334. The first collar section 332 includes an annular ring section 336 that adjoins a radially extending flange 338 at its outer periphery. The second collar section 334 also includes an annular ring section 340 that adjoins a radially extending flange 342 at its outer periphery. The annular ring sections 336, 340 are spaced from one another. The second flange 342 further includes a ramped inner surface 344 that faces the spring 346.

An inner diameter of the first flange 338 is approximately equal to an outer diameter of the second flange 342. The second flange 342 is received within the first flange 338, with the inner surface of the first flange 338 abutting the outer surface of the second flange 342. The first and second collar sections 332, 334 may be pressed fit together, and may include an interference fit. Alternatively, or in addition, the first and second collar sections 332, 334 may be adhered, welded. etc. to one another.

A groove 348 in the collar 330 receives the spring 346. The groove 348 includes sidewalk formed by the annular ring sections 336, 340 and a tapered bottom formed by the ramped inner surface 344. In alternative embodiments, the ramped surface 344 may be replaced with a surface extending radially, such that the groove 348 includes a flat bottom. The pin 350 includes a groove 352 that receives the spring 346. The pin groove 352 has a V-shape, but in alternative embodiments could have any shape.

With reference to FIG. 17, the collar 360 is similar to the collar 330 of FIG. 16. However, the flange 362 of the first collar section 364 tapers radially inward with increasing distance from the annular ring section 366, and the flange 368 of the second collar section 370 tapers radially outward with increasing distance from the annular ring section 372. The overlapping tapered flanges 362, 368 secure the collar sections together 364, 370. The first collar section flange 362 may, for example, comprise an extension of the first annular ring section 366 that is crimped to bend around the second collar section flange 368 after the second collar section 370 is seated against the first annular ring section 366.

Figure 18:
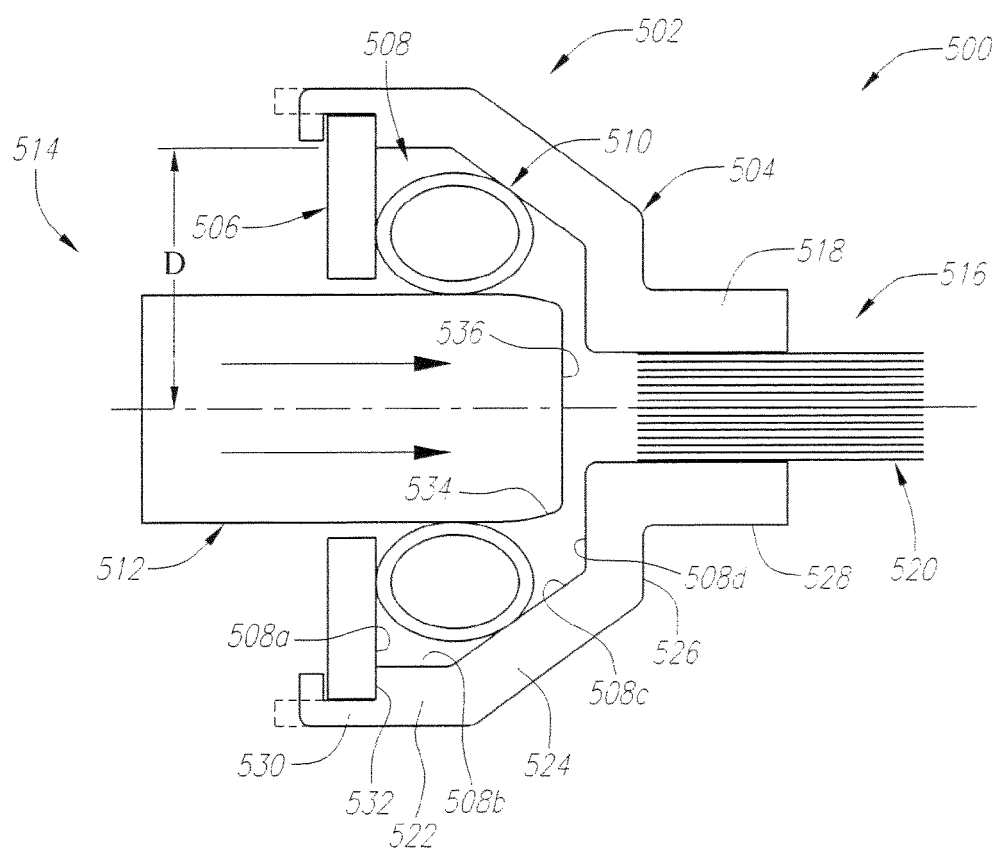
FIG. 18 illustrates a cross-sectional view of a two-piece canted coil spring socket according an exemplary embodiment.

FIG. 18 illustrates a multi-piece or multi-component canted coil spring socket 500 according to another exemplary embodiment. The spring socket 500 has a housing 502, which includes a first housing section 504 and a second housing section 506 that is connectable to the first housing section 504. The housing sections 504 and 506 form a groove 508, which receives a spring 510. The spring 510 may be a canted coil spring 510, such as a garter-type radial or axial canted coil spring 510. Further, the groove 508 may be configured so that the spring 510 includes a turn angle (not shown). The spring socket 500 is configured to receive a pin 512 from a first side 514 of the spring socket 500 such that the pin 512 contacts the spring 510 in a latching, locking, holding or electrical contact type of engagement. On a second side 516 of the spring socket 500, the spring socket 500 may include a connection port 518 configured to receive one or more electrical wires, wire bundles, cables, optical fibers, or pins, which may be referred to herein as wires 520, for conduction electricity and/or light. The connection port 518 may be configured to receive the wires 520 in a removable or plug-type configuration. Alternatively, the wires 520 may be fixed to the first housing section 504 by crimping, with fasteners, by soldering, by welding, and/or other methods that are known to those of ordinary skill in the art.

The first housing section 504 includes a first annular wall 522, a second annular wall 524 that is tapered and extends from the first annular wall 522 toward a centerline CL, an annular flange 526 that is connected to the second annular wall 524, and a third annular wall 528 that extends from the annular flange 526 generally in the direction of the centerline and defines the connection port 518. The second housing section 506 is in the shape of an annulus or a washer. An inner diameter of the first annular wall 522 may be generally uniform except for an end section 530, which has a greater inner diameter so as to define an annular shoulder 532. The outer diameter of the second housing section 506 is slightly less than the inner diameter of the first annular wall 522 at the end section 530, but is greater than the inner diameter of the first annular wall 522 before the end section 530. Accordingly, when the second housing section 506 is inserted into the first housing section 504, it abuts the shoulder 532 to prevent further insertion of the second housing section 506 into the first housing section 504.

An annular space between the second housing section 506, the first annular wall 522, the second annular wall 524 and the annular flange 526 defines the groove 508. Accordingly, the second housing section 506 forms a first sidewall 508a of the groove 508, the first annular wall 522 forms a first bottom wall 508b of the groove 508, the second annular wall 524 forms the second bottom wall 508c of the groove 508, which is inclined toward the centerline CL so as to gradually reduce the diameter of the groove 508, and the annular flange 526 forms a second side wall 508d of the groove 508.

In the illustrated embodiment, the pin 512 includes a cylindrical outer surface with a tapered nose 534 that terminates in a flat leading end 536. The pin 512 may have a smooth outer surface or have a textured outer surface with a texture pattern that may provide preferred characteristics for insertion of the pin 512 into the housing 502 and withdrawal of the pin 512 from the housing 502. The tapered nose 534 decreases the insertion force required to insert the pin 512 into the housing 502. The inner wall of the annular flange 526, which in this embodiment is also the second side wall 508d of the groove 508, functions as a stop for the pin 512 to limit the depth of insertion of the pin 512 in the housing 502.

In one embodiment, the two housing sections 504 and 506 comprise electrically conductive materials. The housing sections 504 and 506 may, for example, comprise any of the materials described above with respect to the housing sections 14, 16 and/or the housing 54 and the insert element 68. In other embodiments, the first housing section 504 may comprise a metal while the second housing section 506 may comprise a plastic. Example materials for the plastic second section 506 include engineered plastic, such as PEEK. In other embodiments, both the first and second collar sections 504 and 506 may comprise a plastic. The spring 510 may, for example, comprise any of the materials described above with respect to the springs 18, 77.

Another embodiment provided herein is a method for assembling the spring socket 500. The wires 520 are connected to the first housing section 504 through the connection port 518. The wires 520 may be press fit, welded, soldered, or fixedly connected to the connection port 518 with an adhesive, or fixedly or removably connected with the connection port 518 by various methods and devices known to those of ordinary skill in the art. The wires 520 may be pre-assembled with the first housing section 504 such that the method of assembling the spring socket 500 as described herein does not require the step of connecting the wires 520 with the first housing section 504. The second housing section 506 is then attached to the first housing section 504 in order to form the groove 508 as described above. The method then includes placing a canted coil spring 510 into the first housing section 504 such that the spring 510 is placed in the groove 508. The spring socket 500 is now assembled and can receive the pin 512. If the spring socket 500 is used as an electrical socket, electrical current in the wire 520 is conducted through the first housing section 504 to the spring 510. Upon insertion of the pin 512, the electrical current flows through the pin 512 from the spring 510 in order to complete the electrical connection between the wires 520 and the pin 512. Furthermore, the compression of the spring 510 by the pin 512 can provide a locking, latching or a holding connection between the pin 512 and the spring socket 500, depending on whether a groove is incorporated on the surface of the pin.

In another embodiment, the two housing sections 504 and 506 are plated with a material that differs from the material of the first housing section 504 and the second housing section 506. Thus, the two-piece housing 502 or at least one of the housing sections, such as the one in contact with the canted coil spring 510, can be made from several different materials.

The above-described spring socket 500 may be used as a connector for latching, locking and/or holding applications either as a mechanical and/or electrical connection with a pin 512. Thus, aspects of the present apparatus, system, and method comprise a multi-piece canted coil spring socket 500 in which a groove 508 is made from two or more housing sections 504 and 506 and wherein a canted coil spring 510 is positioned within the groove 508 for use to latch, lock, and/or hold and/or conduct electrical current. The housing material for such latch, lock, and/or hold applications may not have to be conductive and as such can be molded from an engineering plastic rather than machined from metal. In another embodiment, the first housing section 504 may be made from a metal and the second housing section 506 may be made from a plastic, thereby reducing cost and still providing for electrical contact between a pin 512 and the socket assembly 500.

Referring again to FIG. 18, the centerline CL is spaced from inner surfaces of the housing sections 504 and 506 by a distance D which varies or may vary along the centerline CL. The spring socket 500 may be placed in service by inserting the pin 512 in the direction of the centerline CL (shown by arrows on the pin in FIG. 18), until the pin 512 compresses the spring 510. The spring 510 provides a biasing force and/or electrical connection acting between the housing 502 and the pin 512. The size of the housing can be chosen in various embodiments so as to provide a preferred distance D. In certain applications, for example, decreasing the distance D can decrease the likelihood of misalignment of the pin 512 by closing the gap between the sidewalls of the groove 508 and the outside surface of the pin 512. The spring socket 500 is suitable for a variety of connector applications, including small connector applications on the order of fractions of an inch. With small connector applications, the ability to slide the canted coil spring 510 into a partial groove and then complete the groove 508 allows for quick and easy assembly.

In the embodiment of FIG. 18, all or portions of the end section 530 can be crimped toward the centerline CL in order to secure the second housing section 506 between the shoulder 532 and the crimped end section 530. In FIG. 18, portions of the end sections 530 before being crimped are shown with dashed lines.

Figure 19:
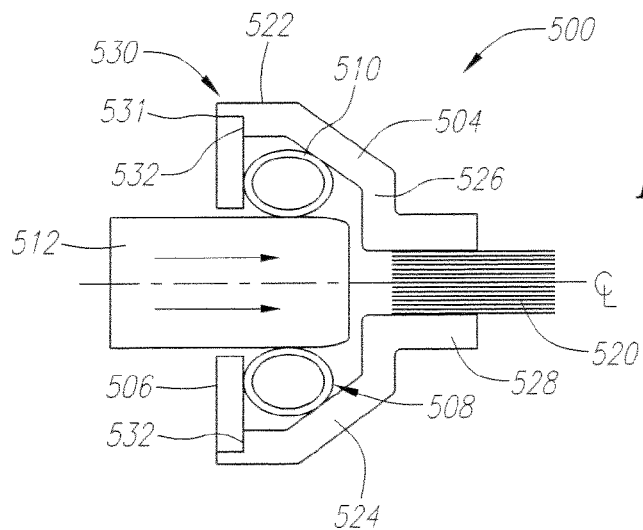
FIG. 19 illustrates a cross-sectional view of a two-piece canted coil spring socket according an exemplary embodiment.

In another exemplary embodiment shown in FIG. 19, the inner diameter of the first annular wall 522 at the end section 530 is slightly less than the outer diameter of the second housing section 506 such that insertion of the second housing section 506 into the first housing section 504 forms a press fit connection. Accordingly, the second housing section 506 is press-fitted into the second housing section 504 at the contact area 531 until it abuts the shoulder 532. Because crimping of the end section 530 is not necessary in this embodiment, the end section 530 of the first annular wall 522 of the first housing section 504 does not extend past the second housing section 506 when the second housing section 506 is press-fitted into the first housing section 504. In other embodiments, laser weld or tack welding may be used to more permanently retain the second housing section to the first housing section.

Figure 20:
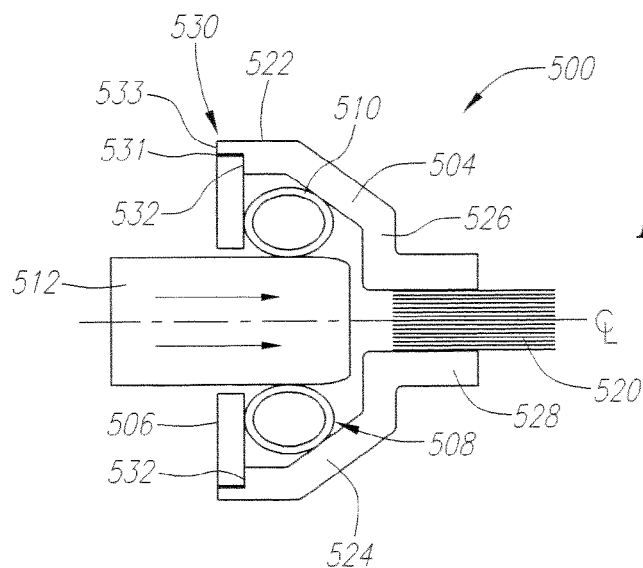
FIG. 20 illustrates a cross-sectional view of a two-piece canted coil spring socket according an exemplary embodiment.

In another exemplary embodiment shown in FIG. 20, the inner diameter of the first annular wall 522 is slightly larger than the outer diameter of the second housing section 506 so as to allow insertion of the second housing section 506 in the first housing section 504. After the second housing section 506 is inserted into the first housing section 504 until it abuts the shoulder 532, the second housing section 506 is welded to the first housing section 504 at or near contact area 531, which is shown by an exemplary weld head 533. Because crimping of the end section 530 is not necessary in this embodiment, the end section 530 of the first annular wall 522 of the first housing section 504 does not extend past the second housing section 506 when the second housing section 506 is inserted into the first housing section 504 until it abuts the shoulder 532.

Figure 21:
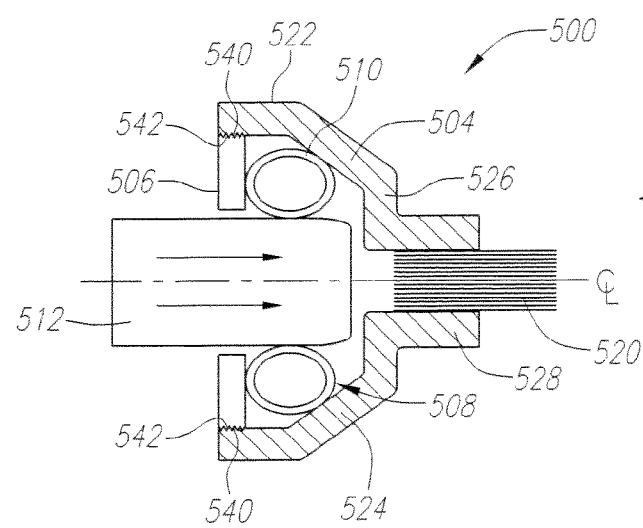
FIG. 21 illustrates a cross-sectional view of a two-piece canted coil spring socket according an exemplary embodiment.

In another exemplary embodiment shown in FIG. 21, the inner diameter of the first annular wall 522 at the end section 530 has generally the same inner diameter as the remaining portions of the first annular wall 522. Accordingly, the first annular wall 522 does not have a shoulder (e.g., shoulder 532 of FIG. 19) for limiting the depth of insertion of the second housing section 506 into the first housing section 504. However, all or portions of the inner surface of the first annular wall 522 at the end section 530 include threads 540. Furthermore, all or portions of the outer surface of the second housing section 506 include threads 542 that correspond in thread characteristics (i.e., pitch, thread shape, etc.) to the threads 540 in order to allow the second housing section 506 to be screwed into the first housing section 504. Thus, the second housing section 506 can be screwed into the first housing section 504 until the ends of the threads 540 and 542 are reached so as to secure the second housing section 506 to the first housing section 504.

Figure 22:
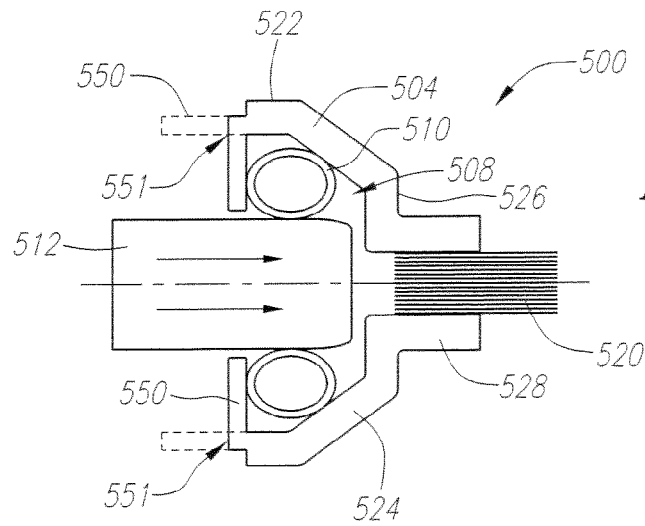
FIG. 22 illustrates a cross-sectional view of a two-piece canted coil spring socket according an exemplary embodiment.

In another exemplary embodiment shown in FIG. 22, the spring socket 500 does not have a second housing section. Instead, the first housing section 504, compared to the embodiments of FIGS. 18-21, performs the functions of the first housing section 504 and the second housing section 506 of the embodiments described above. The first annular wall 522 includes an extended annular wall section 550 having a smaller thickness than the other sections of the first annular wall 522 so as to allow the extended annular wall section 550 to be bent or crimped at a crimping area 551. After the spring 510 is placed inside the first housing section 504, the extended annular wall section 550 can be bent or crimped at crimping area 551 in order to substantially close the second end 514 of the housing 502 and complete formation of the groove 508. The facilitate bending the extended wall portion 550, slits or slots may be incorporated to permit the extended wall portion 550 to be crimped or bent in small sections that are separated from one another by the slits.

Figure 23:
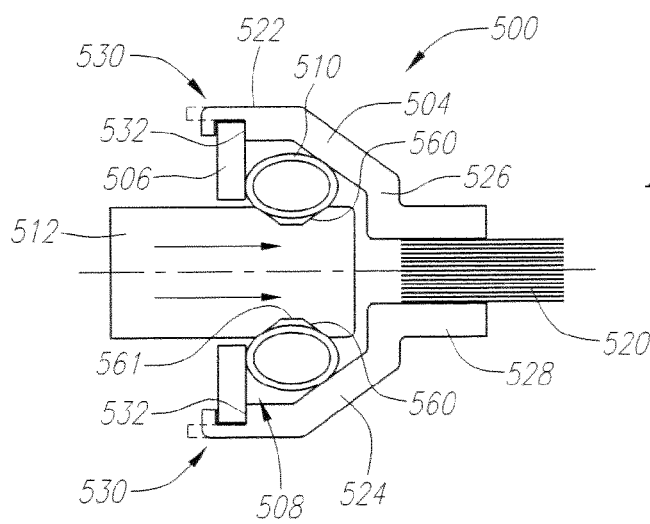
FIG. 23 illustrates a cross-sectional view of a two-piece canted coil spring socket according an exemplary embodiment.

In another exemplary embodiment shown in FIG. 23, the housing 502 is similar to the housing 502 of the embodiment of FIG. 18. However, the pin 512 may include a groove 560 that receives a portion of the spring 510. The groove 560 has a flat bottom wall with two tapered side walls that form a modified V-shaped groove with a flat bottom 561, as shown in FIG. 23. In another embodiment, the groove is a V-shaped groove with an apex (not shown). However, the groove 560 may incorporate other shapes so as to provide a preferred function for the spring socket 500. For example, the groove may have a tapered bottom and a single tapered side wall or a tapered bottom with two generally parallel side walls. By incorporating the groove 560 in the pin 512, the compression characteristics of the spring 510 during insertion of the pin 512 can be further controlled. For example, the second groove 560 allows the spring to latch the pin to the housing. However, if the groove is modified, the pin can then be locked to the housing. One of ordinary skill in the art will readily recognize that pin 512 having the groove 560 can be used with all of the spring sockets disclosed herein.

Figure 24:
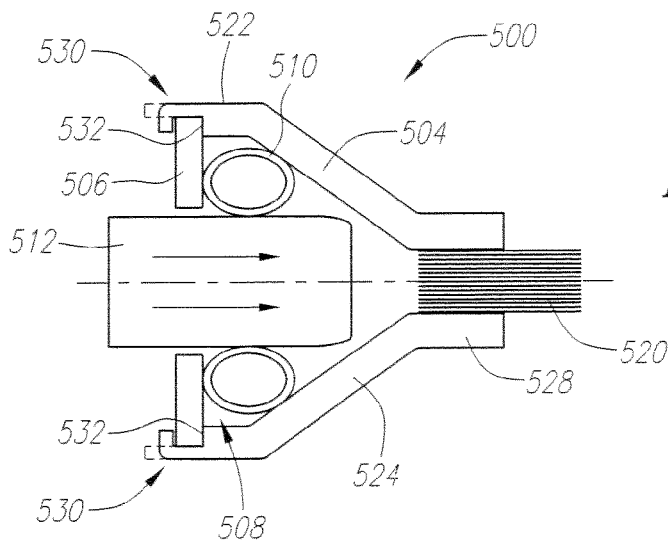
FIG. 24 illustrates a cross-sectional view of a two-piece canted coil spring socket according an exemplary embodiment.

In another exemplary embodiment shown in FIG. 24, the first housing section 504 does not have a first annular flange 526 as compared to the embodiments of FIGS. 18-23. Accordingly, the second annular wall 524 tapers toward the centerline t from the first annular wall 522 to the third annular wall 528. In this embodiment, the pin 512 may be insertable deeper into the first housing section 504 as compared to the embodiment of FIGS. 18-23 due to the first housing section 504 of this embodiment lacking the first annular flange 526. In FIG. 24, the second housing section 506 is secured in the first housing section 504 by crimping the end section 530 of the first annular wall 522 as described above with respect to the embodiment of FIG. 18.

Figure 25A:
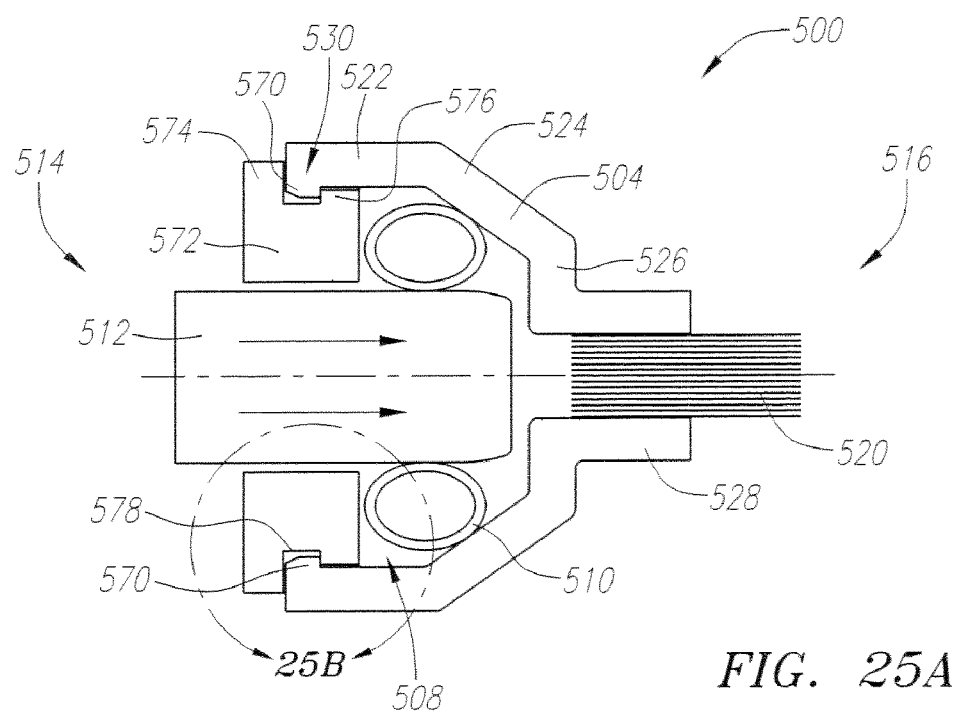
FIG. 25A illustrates a cross-sectional view of a two-piece canted coil spring socket according an exemplary embodiment.
Figure 25B:
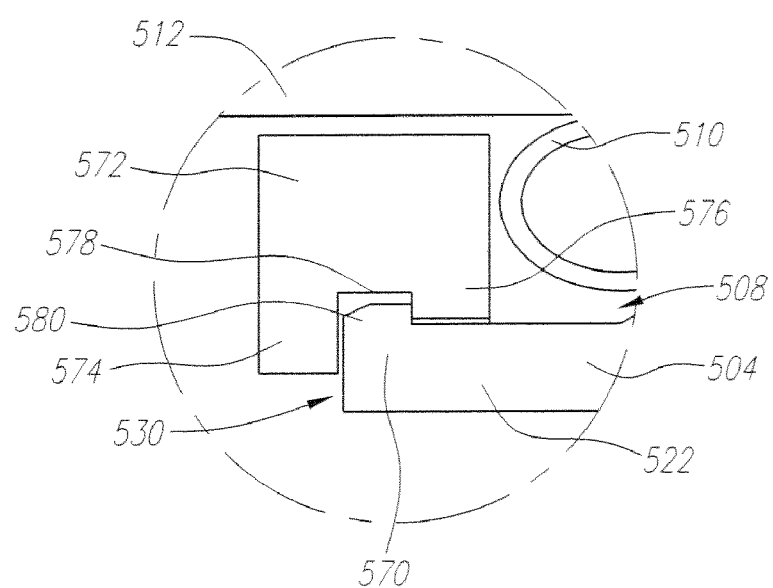
FIG. 25B illustrates an enlarged view of area A of FIG. 25A.

Referring to FIG. 25a and FIG. 25b, another exemplary embodiment is shown which is similar to the embodiment of FIG. 18 in many respects except for the features described below. Accordingly, parts that are similar to the parts described in the embodiment of FIG. 18 are assigned the same reference numbers. The first housing section 504 includes an annular end flange that forms a lip 570 at the end section 530 of the first annular wall 522. A second housing section 572 in the form of a washer or a ring is provided having a first annular projection 574 and a second annular projection 576. An annular groove 578 is defined by the space between first annular projection 574 and the second annular projection 576. Referring FIG. 25b, the inner side of the lip 570 includes an inclined surface 580 facing the direction of entry of the pin 512 or the first side 514 of the housing 502. The outer diameter of the second annular projection 576 of the second housing section 570 is slightly smaller than the inner diameter of the first annular wall 522. When the second housing section 572 is being inserted into the first housing section 504, the second annular projection 576 first contacts the inclined surface 580. As the second housing section 572 is further inserted into the first housing section 504, the second annular projection 576 engages the inclined surface 580 to push the first annular wall 522 of the first housing section 504 outward. As a result, the first housing section 504 elastically expands to allow further insertion of the second housing section 572 therein. When the second annular projection 576 clears the lip 570, the lip 570 snaps into the groove 578 due to the first housing section 504 returning to its pre-expanded state. The first annular projection 574 of the second housing section 572 has a greater outer diameter than the second annular projection 576. Accordingly, the first annular projection 574 abuts against the end section 530 of the first housing section 504 to prevent further insertion of the second housing section 570 into the first housing section 504.

FIG. 26A illustrates a multi-piece or multi-component canted coil spring socket 600 according to another exemplary embodiment. The spring socket 600 has a housing 602, which includes a first housing section 604 and a second housing section 606 that is connectable to the first housing section 604. The housing sections 604 and 606 form a groove 608, which receives a spring 610. The spring 610 may be a canted coil spring 610, such as a garter-type radial or axial canted coil spring 610. Further, the grooves 608 may be configured so that the spring 610 includes a turn angle (not shown). The spring socket 600 is configured to receive a pin 612 from a first side 614 of the spring socket 600 such that the pin 612 contacts the spring 610 in a latching, locking, holding or electrical contact type of engagement, depending on whether and what type of groove is incorporated on the pin. On a second side 616 of the spring socket 600, the spring socket 600 may include a connection port 618 configured to receive one or more electrical wires, wire bundles, cables, optical fibers, or pins, which may be referred to herein as wires 620 for conducting or transmitting electricity and/or light. The connection port 618 may be configured to receive the wires 620 in a removable or plug-type configuration. Alternatively, the wires 620 may be fixed to the first housing section 604 by crimping, using fasteners, by soldering, by welding, and/or other methods that are known to those of ordinary skill in the art.

The first housing section 604 includes a first annular wall 622, an annular flange 626, and a third annular wall 628 that extends from the annular flange 626 generally along the centerline CL and defines the connection port 618. Note that the annular flange 626, which forms one of the side wall of the groove, has a generally straight wall relative to the axis of the pin 612 and is generally perpendicular to the axis of the pin. An inner diameter of the first annular wall 622 may be generally uniform except for an end section 630 having a smaller inner diameter so as to define an annular lip 632. The second housing section 606 is in the shape of a washer or ring and has a wedge-shaped first portion 634 defining an inclined surface 636 on the side of the second housing section 606 facing the centerline and a cylindrical surface on the opposite side. The second housing section 606 also includes a second portion 638 having an outer diameter that is greater than the inner diameter of the first annular wall 622 of the first housing section 604. Accordingly, when the second housing section 606 is inserted in the first housing section 604, the second portion 638 abuts against the end section 630 of the first annular wall 622 to stop further insertion of the second housing section 606 into the first housing section 604.

Referring to FIG. 26B, the inner side of the lip 632 includes an inclined surface 640 facing the first side 614 or the direction of entry of the pin 612. The second housing section 606 includes an outer annular groove 642 between first portion 634 and the second portion 638. The outer diameter of the first portion 634 is substantially similar or slightly smaller than the inner diameter of the first annular wall 622. Accordingly, when the first portion 634 is inserted into the first housing section 604, the first portion 634 contacts the inclined surface 640. As the second housing section 606 is inserted into the first housing section 604, the first portion 634 engages the inclined surface 640 to push the first annular wall 622 of the first housing section 604 outward. As a result, the first housing section 604 elastically expands to allow further insertion of the second housing section 606 therein. When the first portion 634 clears the lip 632, the lip 632 snaps into the groove 642 as the first housing section 604 returns to its pre-expanded state. The second portion 638 has a greater outer diameter than the inner diameter of the first annular wall 622. Accordingly, the second portion 638 abuts the end section 630 of the first annular wall 622 to prevent further insertion of the second housing section 606 into the first housing section 604.

Referring again to FIG. 26A, an annular space between the second housing section 606, the first annular wall 622 and the annular flange 626 defines the groove 608. Accordingly, the second housing section 606 forms a first sidewall 608a of the groove 608 and a first bottom wall 608b, or at least a portion of the bottom wall, of the groove. The first bottom wall 608b is formed by the wedge-shaped first portion 634 so as to provide an inclined bottom wall for the groove 608. The first annular wall 622 forms the second bottom wall 608c of the groove 608, and the annular flange 626 forms a second side wall 608d of the groove 608. The inclined wall 608b is in contact with the spring and is a provided as a surface for the spring to load against when the pin is inserted.

In the illustrated embodiment, the pin 612 includes a cylindrical outer surface with a tapered nose 650 that terminates in a flat leading end 652. The pin 612 may have a smooth or a textured outer surface with a texture pattern that may provide preferred characteristics for insertion of the pin 512 into the housing 502 and withdrawal of the pin 512 from the housing 502. The tapered nose 650 decreases the insertion force required to insert the pin 612 into the housing 602. The inner wall of the annular flange 626, which in this embodiment is also the second side wall 608d of the groove 608, functions as a stop for the pin 612 which limits the depth of insertion of the pin 612 in the housing 602.

In one embodiment, the two housing sections 604 and 606 comprise electrically conductive materials. The housing sections 604 and 606 may, for example, comprise any of the materials described above with respect to the housing sections 14, 16 and/or the housing 54 and the insert element 68. In other embodiments, the first housing section 604 may comprise a metal while the second housing section 606 may comprise a plastic or non-conductive material. Exemplary materials for the plastic second section 606 include engineered plastic, such as PEEK. The spring 610 may, for example, comprise any of the materials described above with respect to the springs 18, 77. As shown, electricity or signals may conduct among the cable or wire 620, the spring 610, the first housing section 604, and the pin 612.

Another embodiment provided herein is a method for assembling the spring socket 600. The wires 620 are connected to the first housing section 604 through the connection port 618. As discussed above, the wires 620 may be press fit, welded, soldered, fixedly connected to the connection port 618 using mechanical retaining means, such as a fastener, or fixedly or removably connected with the connection port 618 by various methods and devices known to those of ordinary skill in the art. The wires 620 may be pre-assembled with the first housing section 604 such that the method of assembling the spring socket 600 as described herein does not require the step of connecting the wires 620 with the first housing section 604. The second housing section 606 is then attached to the first housing section 604 in order to complete the formation of the groove 608. The method includes placing a canted coil spring 610 into the first housing section 604 such that the spring 610 is placed in the groove 608. If the spring socket 600 is used as an electrical socket, the current in the wire 620 is conducted through the first housing section 604 to the spring 610. Upon insertion of the pin 612, current flows through the pin 612 from the spring 610 in order to complete the electrical connection between the wires 620 and the pin 612. Furthermore, the compression of the spring 610 by the pin 612 can provide a locking, latching or holding connection between the pin 612 and the spring socket 600, depending on whether a groove is incorporated on the pin and the type of groove.

In another embodiment, the two housing sections 604 and 606 are plated with a material that differs from the material used to make or form the first housing section 604 and the second housing section 606. Thus, the two-piece housing 602 or at least one of the housing sections, such as the one in contact with the canted coil spring 610, can be made from several different materials, such as one base material and one or more coating or cladding layers.

As understood herein, the above-described spring socket 600 may be used as a connector for latching, locking and/or holding applications either as a mechanical and/or electrical connection with a pin 612. Thus, aspects of the present apparatus, system, and method comprise a multi-piece canted coil spring socket 600 in which a groove 608 is made from two or more housing sections 604 and 606 and wherein a canted coil spring 610 is positioned within the groove 608 for use to latch, lock, and/or hold and/or conduct electrical current. At least some of the housing material for such latch, lock, and/or hold applications may not have to be conductive and as such can be molded from an engineering plastic rather than machined from metal. In another embodiment, the first housing section 604 may be made from a metal and the second housing section 606 may be made from a plastic, thereby reducing cost and still providing for electrical contact between a pin 612 and the socket assembly 600.

The two-piece housing 602 defines a centerline CL which is spaced from inner surfaces of the housing sections 604 and 606 by a distance D. The spring socket 600 may be placed in service by inserting the pin 612 in the direction of the centerline (shown by arrows on the pin in FIG. 26A), until the pin 612 compresses the spring 610. The spring 610 provides a biasing force and/or electrical connection acting between the housing 602 and the pin 612. The size of the housing can be chosen in various embodiments so as to provide a preferred distance D. In certain applications, for example, decreasing the distance D can decrease the likelihood of misalignment of the pin 612 by closing the gap between the sidewalls of the groove 608 and the outside surface of the pin 612. The spring socket 600 is suited for a variety of connector applications including small connector applications on the order of fractions of an inch. With small connector applications, the ability to slide the canted coil spring 610 into a partial groove and then complete the groove 608 allows for quick and easy assembly. As discussed above, the groove may be completed by assembling one or more additional housing sections to complete the groove or manipulating the first housing itself to complete the groove, the latter being shown in FIG. 22.

In another exemplary embodiment shown in FIG. 27, the inner diameter of the first annular wall 622 at the end section 630 has generally the same inner diameter as the remaining portions of the first annular wall 622. Accordingly, the first annular wall 622 does not have the annular lip 632 of the embodiment of FIGS. 26A and 26B. All or portions of the annular inner surface of the first annular flange 622 at the end section 630 include threads 644. Furthermore, instead of having the annular groove 642 for mating with an annular lip, all or portions of the annular outer surface of the second housing section 606 include threads 646 that correspond in thread characteristics (i.e., pitch, thread shape, etc.) to the threads 644 in order to allow the second housing section 606 to be screwed into the first housing section 604. Thus, the second housing section 606 can be screwed into the first housing section 604 until the ends of the threads 644 and 646 are reached so as to secure the second housing section 606 to the first housing section 604.

In another exemplary embodiment shown in FIG. 28, the first housing section 604 and the second housing section 606 are attached to each other by threads 644 and 646 as discussed above in detail. In this embodiment, however, the wedge-shaped first portion 634 of the second housing section 606 is larger as compared to the first portion 634 of the embodiment of FIG. 27. Accordingly, the second housing section 606 of FIG. 28 has a larger inclined surface 636 and is provided without a perpendicular wall section relative to the axis of the pin.

Figure 29:
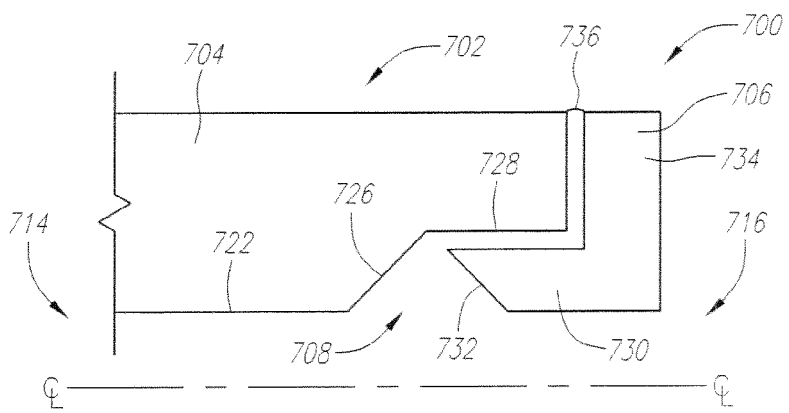
FIG. 29 illustrates a cross-sectional view of a two-piece housing of a two-piece canted coil spring socket according an exemplary embodiment.

FIG. 29 illustrates a partial cross-sectional view of a multi-piece or multi-component canted coil spring socket 700 according to another exemplary embodiment. The spring socket 700 has a housing 702, which includes a first housing section 704 and a second housing section 706 that is connectable to the first housing section 704. The housing sections 704 and 706 form a groove 708, which is configured to receive or accommodate a spring (not shown). The spring may be a canted coil spring, such as a garter-type radial or axial canted coil spring. The spring socket 700 is configured to receive a pin (not shown) from a first side 714 of the spring socket 700 such that the pin contacts the spring in a latching, locking, holding or electrical contact type of engagement. On a second side 716 of the spring socket 700, the spring socket 700 may include a connection port (not shown) configured to receive one or more electrical wires, wire bundles, cables, optical fibers, or pins for conducting electricity, signals and/or light.

Portions of the first housing section 704 that are not shown in FIG. 29 may be similar to the first housing sections or collars of any of the embodiments described elsewhere herein.

The first housing section 704 includes a first annular wall 722, an outwardly tapered second annular wall 726 and a third annular wall 728. Due to the taper of the second annular wall 726, the third annular wall 728 has a larger inner diameter than the first annular wall 722. The second housing section 706 has a first annular wall 730 with a tapered end 732 and an annular flange 734. When the second housing section 706 is inserted in the first housing section 704, the flange 734 abuts against the axial outer surface of the third annular wall 728 to prevent further insertion of the second housing section 706 into the first housing section 704. The first housing section 704 and the second housing section 706 can be attached to each other by any methods or devices known to those of ordinary skill in the art, including those described herein with respect to other exemplary embodiments. In the example shown in FIG. 29, the first housing section 704 and the second housing section 706 are welded at one or more points of contact between the flange 734 and the third annular wall 728. For example, the first housing section 704 and the second housing section 706 may be welded together as illustrated in FIG. 29 by a weld bead 736. The groove 708 is formed by the tapered second annular wall 726 of the first housing section 704 and the tapered end 732 of the first annular wall 730 of the second housing section 706. Accordingly the grove 708 is V-shaped. However, the groove may take on other geometric configuration, such as having two side walls and a bottom wall located therebetween and variations thereof, such as tapering one or more of the walls.

Figure 30:
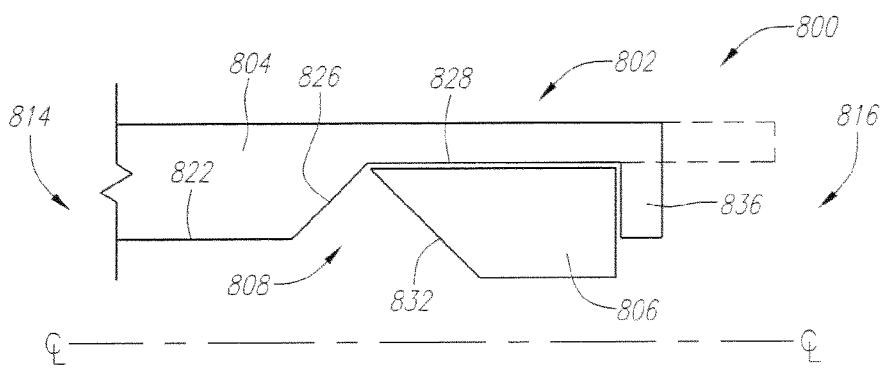
FIG. 30 illustrates a cross-sectional view of a two-piece housing of a two-piece canted coil spring socket according an exemplary embodiment.

FIG. 30 illustrates a partial cross-sectional view of a multi-piece or multi-component canted coil spring socket 800 according to another exemplary embodiment. The spring socket 800 has a housing 802, which includes a first housing section 804 and a second housing section 806 that is connectable to the first housing section 804. The housing sections 804 and 806 form a groove 808, which receives a spring (not shown). The spring may be a canted coil spring, such as a garter-type radial or axial canted coil spring. The spring socket 800 is configured to receive a pin (not shown) from a first side 814 of the spring socket 800 such that the pin contacts the spring in a latching, locking, holding or electrical contact type of engagement. On a second side 816 of the spring socket 800, a connection port (not shown) configured to receive one or more electrical wires, wire bundles, cables, optical fibers, or pins for conduction electricity and/or light may be incorporated. Portions of the first housing section 804 that are not shown in FIG. 30 may be similar to the first housing sections or collars of any of the embodiments described elsewhere herein.

The first housing section 804 includes a first annular wall 822, an outwardly tapered second annular wall 826 and a third annular wall 828. Due to the taper of the second annular wall 826, the third annular wall 828 has a larger inner diameter than the first annular wall 822. The second housing section 806 is in the shape of a sleeve having a generally rectangular cross section except for a tapered end 832. When the second housing section 806 is inserted in the first housing section 804, the tapered end 832 abuts the tapered second annular wall 826 of the first housing section 804 to prevent further insertion of the second housing section 806 into the first housing section 804. The groove 808 is formed by the tapered second annular wall 826 of the first housing section 804 and the tapered end 832 of the second housing section 806. Therefore, the groove 808 is V-shaped. However, the groove may take on other geometric configuration, such as having two side walls and a bottom wall located therebetween and variations thereof, such as tapering one or more of the walls.

The third annular wall 828 of the first housing section has a greater length along the centerline CL than the second housing section 806 to define a crimping portion 836 extending beyond the second housing section 806 when the second housing section 806 is fully inserted into the first housing section 804. In order to retain the second housing section 806 in the first housing section 804, the crimping portion 836 can be crimped toward the centerline CL as shown in FIG. 30.

Figure 31:
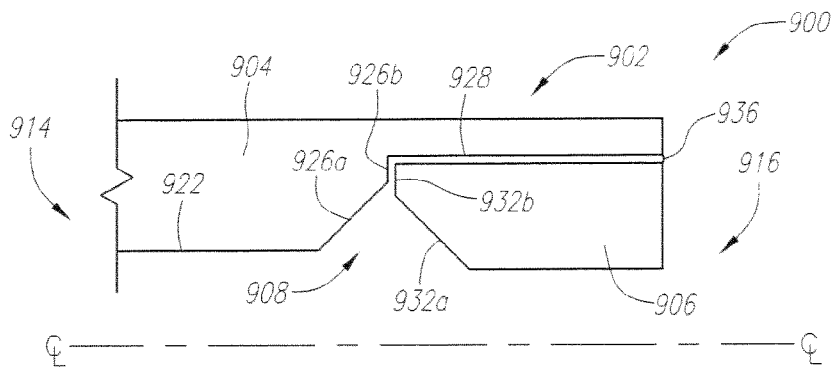
FIG. 31 illustrates a cross-sectional view of a two-piece housing of a two-piece canted coil spring socket according an exemplary embodiment.

FIG. 31 illustrates a partial cross-sectional view of a multi-piece or multi-component canted coil spring socket 900 according to another exemplary embodiment. The spring socket 900 has a housing 902, which includes a first housing section 904 and a second housing section 906 that is connectable to the first housing section 904. The housing sections 904 and 906 form a groove 908, which receives a spring (not shown). The spring may be a canted coil spring, such as a garter-type radial or axial canted coil spring. The spring socket 900 is configured to receive a pin (not shown) on a first side 914 of the spring socket 900 such that the pin contacts the spring in a latching, locking, holding or electrical contact type of engagement. On a second side 916 of the spring socket 900, the spring socket 900 may include a connection port (not shown) configured to receive one or more electrical wires, wire bundles, cables, optical fibers, or pins for conduction electricity and/or light. Portions of the first housing section 904 that are not shown in FIG. 31 may be similar to the first housing sections or collars of any of the embodiments described herein.

The first housing section 904 includes a first annular wall 922, a second annular wall 926 having and outwardly tapered section 926a and a shoulder 926b, and a third annular wall 928. Due to the outward taper of the tapered section 926a and the shoulder 926b, the third annular wall 928 has a larger inner diameter than the first annular wall 922. The second housing section 906 is in the shape of a sleeve having a generally rectangular cross section as shown in FIG. 31 except for a tapered end 932a and a shoulder 932b. When the second housing section 906 is inserted in the first housing section 904, the shoulder 932a abuts the shoulder 926b to prevent further insertion of the second housing section 906 into the first housing section 904. The groove 908 is formed by the tapered section 926a of the first housing section 904 and the tapered end 932a of the second housing section 906. Thus, the groove 908 is V-shaped. However, the groove may take on other geometric configuration, such as having two side walls and a bottom wall located therebetween and variations thereof, such as tapering one or more of the walls.

The first housing section 904 and the second housing section 906 can be attached to each other by any method or device known to those of ordinary skill in the art, including those described elsewhere herein. In the example shown in FIG. 31, the first housing section 904 and the second housing section 906 are welded together as shown by the exemplary weld bead 936.

Figure 32:
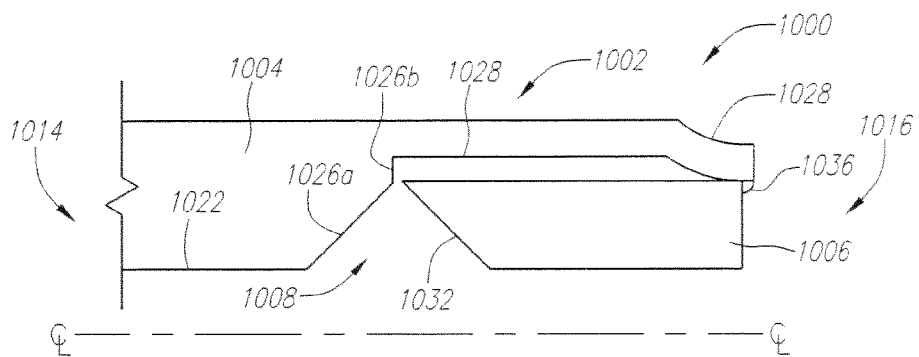
FIG. 32 illustrates a cross-sectional view of a two-piece housing of a two-piece canted coil spring socket according an exemplary embodiment.

FIG. 32 illustrates a partial cross-sectional view of a multi-piece or multi-component canted coil spring socket 1000 according to another exemplary embodiment. The spring socket 1000 has a housing 1002, which includes a first housing section 1004 and a second housing section 1006 that is connectable to the first housing section 1004. The housing sections 1004 and 1006 form a groove 1008, which receives a spring (not shown). The spring may be a canted coil spring, such as a garter-type radial or axial canted coil spring. The spring socket 1000 is configured to receive a pin (not shown) on a first side 1014 of the spring socket 1000 such that the pin contacts the spring in a latching, locking, holding or electrical contact type of engagement. On a second side 1016 of the spring socket 1000, the spring socket 1000 may include a connection port (not shown) configured to receive one or more electrical wires, wire bundles, cables, optical fibers, or pins for conduction electricity and/or light. Portions of the first housing section 1004 that are not shown in FIG. 32 may be similar to the first housing sections or collars of any of the embodiments described herein.

The first housing section 1004 includes a first annular wall 1022, a second annular wall 1026 having and outwardly tapered section 1026a and a shoulder 1026b, and a third annular wall 1028. Due to the outward taper of the tapered section 1026a and the shoulder 1026b, the third annular wall 1028 has a larger inner diameter than the first annular wall 1022. The second housing section 1006 is in the shape of a sleeve having a generally rectangular cross section as shown in FIG. 32, except for a tapered end 1032. When the second housing section 1006 is inserted in the first housing section 1004, the tapered end 1032 abuts the shoulder 1026b of the first housing section 1004 to prevent further insertion of the second housing section 1006 into the first housing section 1004.

The third annular wall 1028 has an inwardly cone-crimped portion 1028a that contacts the outer surface of the second housing section 1006. As a result, the remaining portions of the third annular wall 1028 are spaced apart from the outer surface of the second housing section 1006. The first housing section 1004 and the second housing section 1006 can be attached to each other by any method or device known to those of ordinary skill in the art, including those described elsewhere herein. In the example shown in FIG. 32, the first housing section 1004 and the second housing section 1006 are welded at one or more points of contact between the second housing section 1006 and the third annular wall 1028 as illustrated in FIG. 32 with the weld bead 1036.

The groove 1008 is formed by the second annular wall 1026 and tapered section 1032a of the second housing section 1006. Because the second housing section 1006 loosely fits inside the first housing section 1004, the shape of the groove 1008 can change depending of the position of the second housing section 1006. Accordingly, the groove 1008 may be partially formed by the tapered section 1026a and the tapered end 1032a. Alternatively, the groove 1008 may be formed by the tapered section 1026a and the shoulder 1026b of the first housing section 1004, and the tapered end 1032a of the second housing section.

Figure 33:
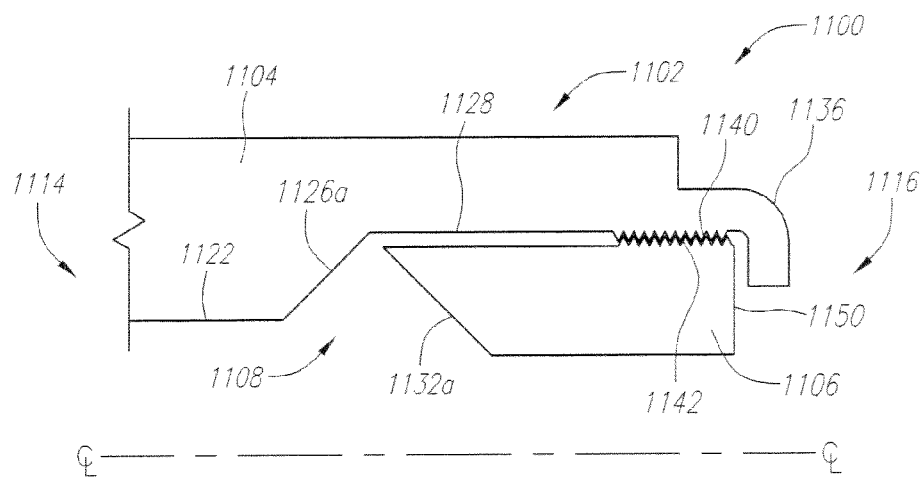
FIG. 33 illustrates a cross-sectional view of a two-piece housing of a two-piece canted coil spring socket according an exemplary embodiment.
Figure 34:
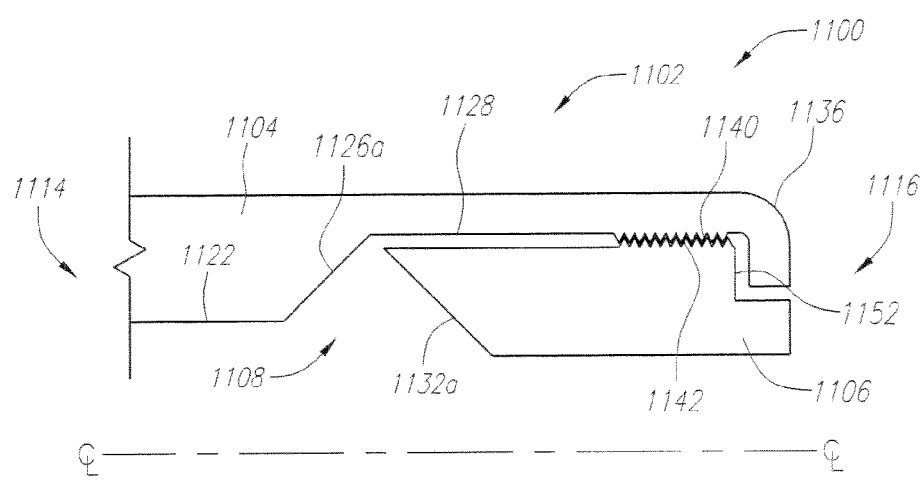
FIG. 34 illustrates a cross-sectional view of a two-piece housing of a two-piece canted coil spring socket according an exemplary embodiment.
Figure 35:
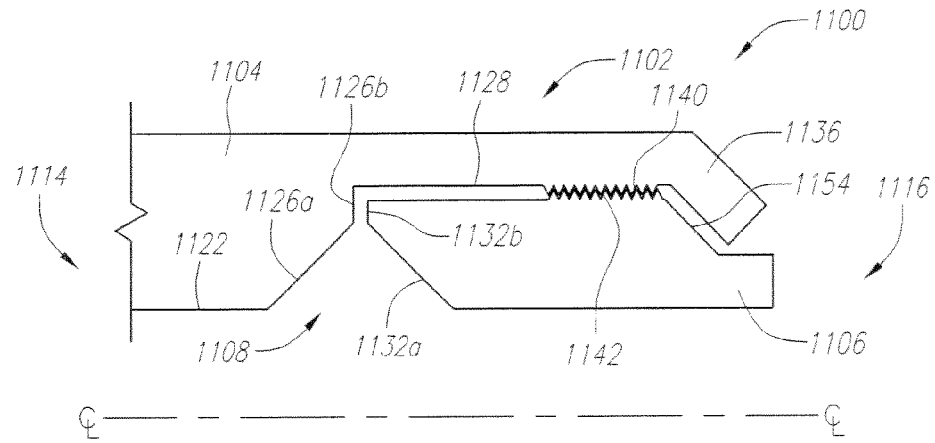
FIG. 35 illustrates a cross-sectional view of a two-piece housing of a two-piece canted coil spring socket according an exemplary embodiment.

FIGS. 33-35 illustrate partial cross-sectional views of multi-piece or multi-component canted coil spring sockets 1100 according to another exemplary embodiment. The spring socket 1100 has a housing 1102, which includes a first housing section 1104 and a second housing section 1106 that is connectable to the first housing section 1104. The housing sections 1104 and 1106 form a groove 1108, which receives a spring (not shown). The spring may be a canted coil spring, such as a garter-type radial or axial canted coil spring. The spring socket 1100 is configured to receive a pin (not shown) on a first side 1114 of the spring socket 1100 such that the pin contacts the spring in a latching, locking, holding or electrical contact type of engagement. On a second side 1116 of the spring socket 1100, a connection port (not shown) configured to receive one or more electrical wires, wire bundles, cables, optical fibers, or pins for conduction electricity and/or light may be incorporated. Portions of the first housing section 1104 that are not shown in FIGS. 33-35 may be similar to the first housing sections or collars of any of the embodiments described herein.

The first housing section 1104 includes a first annular wall 1122 and a second annular wall 1126 having only a tapered section 1126a as shown in FIGS. 33 and 34 or both a tapered section 1126a and a shoulder 1126b as shown in FIG. 35. The first housing section 1104 also includes a third annular wall 1128. Due to the taper in the tapered section 1126a of FIGS. 33 and 34 or both the tapered section 1126a and the shoulder 1126b of FIG. 35, the third annular wall 1128 has a larger inner diameter than the first annular wall 1122. The second housing section 1106 is in the shape of a sleeve having only a tapered end 1132a as shown in FIGS. 33 and 34 or both a tapered end 1132a and a shoulder 1132h as shown in FIG. 35. In the embodiments of FIGS. 33 and 34, when the second housing section 1106 is inserted in the first housing section 1104, the tapered end 1132a abuts the tapered second annular wall 1126a of the first housing section 1104 to prevent further insertion of the second housing section 1106 into the first housing section 1104. In the embodiment of FIG. 35, when the second housing section 1106 is inserted in the first housing section 1104, the shoulder 1132a abuts the shoulder 1126b of the first housing section 1104 to prevent further insertion of the second housing section 1106 into the first housing section 1104.

The third annular wall 1128 of the first housing section 1104 includes a crimping portion 1136. In order to secure the second housing section 1106 to the first housing section 1104, the crimping portion 1136 can be crimped toward the centerline $\mathcal{L}$ as shown in FIGS. 33-35. Additionally, at least a portion of the outer surface of the second housing section 1106, which is shown with reference 1140, and at least a portion of the outer surface of the third annular wall 1128 of the first housing section 1104, which is shown with reference 1142, are knurled so as to substantially prevent the second housing section 1106 from play in the first housing section 1106. The knurled outer surfaces assist in frictionally maintaining the second housing section 1106 connected to the first housing section 1104 without substantial play.

Referring again to FIG. 33, the third annular wall 1128 of the first housing section 1104 is longer than the second housing section 1106. Accordingly, the crimping portion 1136 contacts the side wall 1150 of the second housing section 1106 so as to restrict movement of the second housing section 1106 in the first housing section 1104. In FIG. 34, the third annular wall 1128 of the first housing section 1104 is the same length as the length of the second housing section 1106. Furthermore, the second housing section includes an annular cutout defining an annular shoulder 1152 for receiving the crimped portion 1136. In FIG. 35, the crimped portion 1136 is cone shaped, i.e., tapered or inclined. The second housing section 1106 also includes an inclined annular cutout or inclined shoulder 1154 corresponding to the inclination of the crimped portion 1136.

Figure 36:
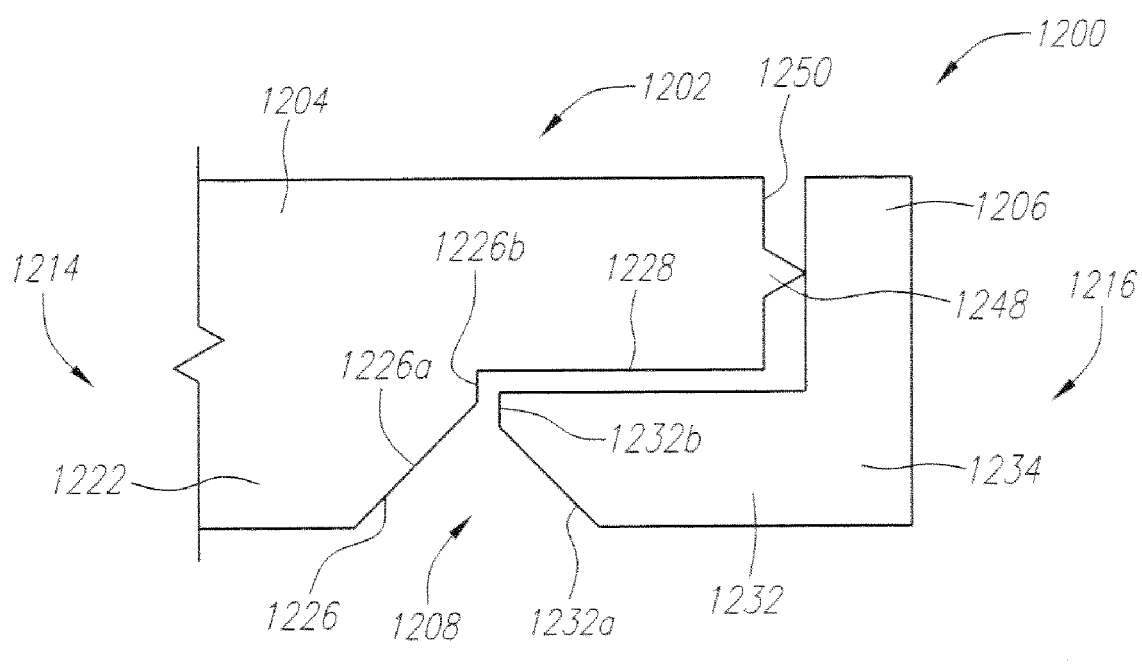
FIG. 36 illustrates a cross-sectional view of a two-piece housing of a two-piece canted coil spring socket according an exemplary embodiment.

FIG. 36 illustrates a partial cross-sectional view of a multi-piece or multi-component canted coil spring socket 1200 according to another exemplary embodiment. The spring socket 1200 has a housing 1202, which includes a first housing section 1204 and a second housing section 1206 that is connectable to the first housing section 1204. The housing sections 1204 and 1206 form a groove 1208, which receives a spring (not shown). The spring may be a canted coil spring, such as a garter-type radial or axial canted coil spring. The spring socket 1200 is configured to receive a pin (not shown) on a first side 1214 of the spring socket 1200 such that the pin contacts the spring in a latching, locking, holding or electrical contact type of engagement. On a second side 1216 of the spring socket 1200, the spring socket 1200 may include a connection port (not shown) configured to receive one or more electrical wires, wire bundles, cables, optical fibers, or more pins for conducting electricity and/or light. Portions of the first housing section 1204 that are not shown in FIG. 36 may be similar to the first housing sections or collars of any of the embodiments described herein.

The first housing section 1204 includes a first annular wall 1222, a second annular wall 1226 having and outwardly tapered section 1226a and a shoulder 1226b, and a third annular wall 1228. Due to the outward taper of the tapered section 1226a and the shoulder 1226b, the third annular wall 1228 has a larger inner diameter than the first annular wall 1222. The second housing section 1206 includes a first annular wall 1230 with a tapered end 1232a, a shoulder 1232g, and an annular flange 1234. When the second housing section 1206 is inserted in the first housing section 1204, the flange 1234 abuts against an end surface 1250 of the third annular wall 1228 to prevent further insertion of the second housing section 1206 into the first housing section 1204. Alternatively, when the second housing section 1206 is inserted in the first housing section 1204, the shoulder 1232b abuts the shoulder 1226b to prevent further insertion of the second housing section 1206 into the first housing section 1204. The groove 1208 is formed by the tapered section 1226a of the first housing section 1204 and the tapered end 1232a of the second housing section 1206. Thus, the groove 1208 is V-shaped.

The first housing section 1204 and the second housing section 1206 can be attached to each other by any methods or devices known to those of ordinary skill in the art, including those described herein with respect to other exemplary embodiments. In the example shown in FIG. 36, the first housing section 1204 and the second housing section 1206 are welded with a projection weld 1248 at one or more points of contact between the flange 1234 and the end surface 1250 of the third annular wall 1228.

Figure 37A:
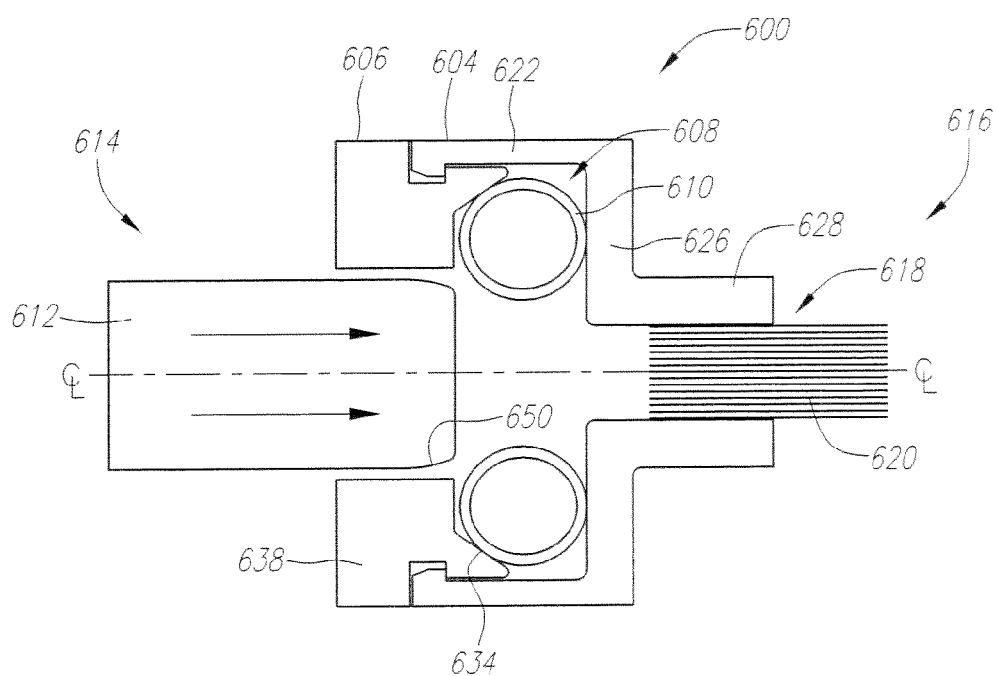
FIGS. 37A and 37B illustrate a two-step sequence of connecting an insert element to a housing of a the two-piece canted coil spring socket of the embodiment of FIG. 26A.
Figure 37B:
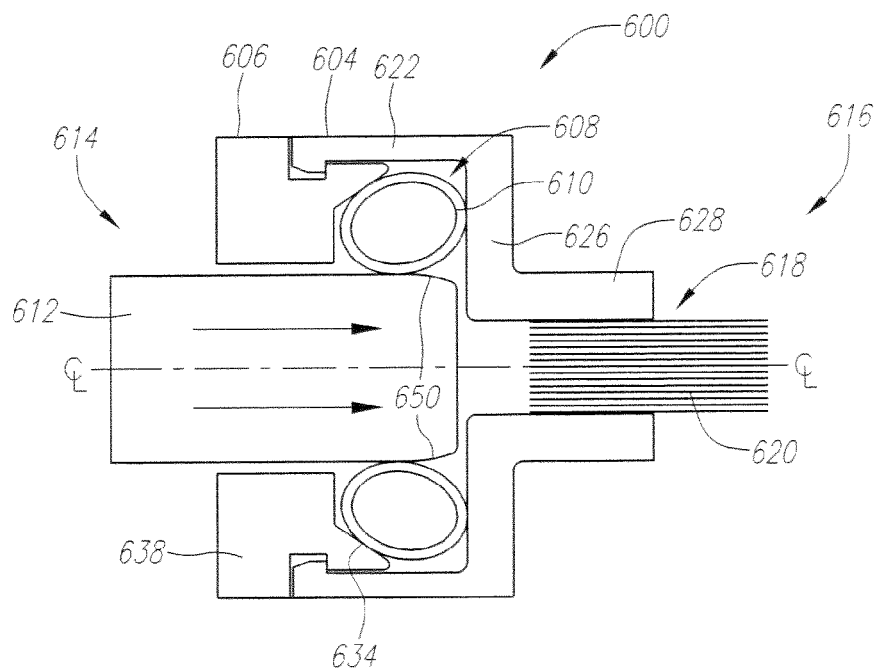

With respect to the all of the embodiments described herein, the shape of the groove can affect the insertion force of the pin into the spring socket and the withdrawal force of the pin out of the spring socket. FIGS. 37A and 37B illustrate a two-step sequence of inserting the pin 612 into the spring socket 600. As the pin 612 is inserted into the housing 602 from the first side 614, the tapered nose 650 and subsequently the section of the pin 612 following the tapered nose 650 contact the spring 610. The tapered nose 650 facilitates compression and/or rotation of the spring 610 as compared to a pin without the tapered nose 650. As shown in FIG. 37B, the pin 612 compresses the spring as it pushes the spring in the direction of entry of the pin 612. Because the inner surface of the third annular wall 626 prevents movement of the spring 610 in the same direction as the pin 612, the spring 610 instead rotates counterclockwise as shown in FIG. 37B with the assistance of the inclined surface 634 of the second housing section 606. Thus, the inclined surface 634 reduces the force required by the pin 612 to compress the spring 610 during entry of the pin 612 by assisting the spring 610 to rotate in the direction of entry of the pin 612 or counterclockwise as shown in FIG. 37B.

When the pin 612 is being withdrawn from the spring socket 600, the spring 610 resists rotation in the clockwise direction because withdrawal of the pin 612 tends to be in the loading direction of the spring 610 and against the spring force, which further compresses the spring. As a result, the force required to withdraw is the pin 612 from the spring socket 600 is greater than the entry force. Thus, an outward taper of the groove in the direction of entry of the pin generally reduces the insertion force of the pin into the spring socket relative to the force required to withdraw the pin from the socket. On the other hand, an inwardly taper of the groove in the direction of entry of the pin generally increases the insertion force of the pin into the spring socket relative to the force required to withdraw the pin from the socket. In other words, the groove may be modified to rotate the spring in the clockwise direction upon insertion. A V-shaped groove which has an outward taper followed by an inward taper allows the insertion force and the withdrawal force to be substantially similar depending on the shape and symmetry of the V-shaped groove. One of ordinary skill in the art will recognize that the slope, depth and surface structure of any tapered section of a groove can directly affect the force required for insertion of the pin into the spring socket and the force required for withdrawal of the pin from the spring socket. For example, inserting a pin into and withdrawing a pin from a rectangular groove is more difficult than performing the same actions with a V-shaped groove of the same depth.

The above description presents the best mode contemplated for the multi-component housing/collar assemblies, in such full, clear, concise, and exact terms as to enable any person skilled in the art to which it pertains to make and use the assemblies. The assemblies, however, are susceptible to modifications and alternate constructions from that discussed above that are fully equivalent. Furthermore, aspects or features expressly discussed for one embodiment may be used or incorporated in another embodiment provided the features or functionality do not conflict. Consequently, the housing/collar assemblies are not limited to the particular embodiments disclosed. On the contrary, the disclosure covers all modifications and alternate constructions coming within the spirit and scope of the disclosure as generally expressed by the following claims, which particularly point out and distinctly claim the subject matter of the disclosure.

The invention claimed is:

1. A connector comprising:
    a canted coil spring;
    a multi-piece housing having a lengthwise housing axis and comprising:
        a first housing part comprising a first open end and a bore;
        a second housing part comprising a second open end and a bore, said second housing part secured to the first housing part to define a housing bore having two open ends, said second housing part comprising a tapered wall defined by a first section of the second housing part with a first inner diameter and a second section of the second housing part with a second inner diameter greater than the first inner diameter;
        a groove formed in the housing bore by the connection of the first housing part with the second housing part, the groove having at least a portion of the canted coil spring disposed therein and having a tapered side wall formed at least partly by the tapered wall of the second housing part; and
    an insert element inserted into the housing bore and biasing the canted coil spring against the groove; and
    wherein the second housing part is secured to the first housing part by at least one of a threaded engagement, a weld, a press fit engagement, a crimping engagement, a bending engagement with a portion of the first housing part or the second housing part being bent to secure the first and second housing parts together, and a positive detent engagement with a projection in one of the first and second housings engaging a groove in other of the first and second housings.

2. The connector of claim 1, wherein the first housing part comprises a first section with a first inner diameter and a second section with a second inner diameter greater than the first inner diameter to define a tapered wall of the first housing part, the groove having another tapered side wall formed at least partly by the tapered wall of the first housing part.

3. The connector of claim 2, wherein the groove comprises a flat bottom at least partly formed by the second section of the first housing part.

4. The connector of claim 1, wherein the groove comprises a flat bottom at least partly formed by the second section of the second housing part.

5. The connector of claim 1, wherein at least a portion of the groove and at least a portion of the insert element contacting the canted coil spring are electrically conductive, and wherein the canted coil spring electrically connects the housing with the insert element.

6. The connector of claim 1, wherein the insert element comprises a groove in contact with at least a portion of the canted coil spring.

7. The connector of claim 1, further comprising a conductive liner positioned, at least in part, in the groove and in contact with the canted coil spring.

8. The connector of claim 1, further comprising a sidewall extending from the tapered wall, said sidewall being generally perpendicular to the lengthwise housing axis.

9. The connector of claim 1, further comprising a generally planar exterior end surface on the multi-piece housing abutting a generally planar surface located on the insert element to limit insertion travel of the insert element into the housing bore.

10. The connector of claim 1, wherein the first housing part has an internal diameter and the second housing part has an internal diameter, and wherein the two internal diameters are different.

11. The connector of claim 1, wherein the first housing part has an outside diameter and the second housing part has an outside diameter, and wherein the two outside diameters are different.

12. The connector of claim 1, wherein the second housing part has an exterior surface and an end surface and wherein the first housing part overlaps all of the exterior surface of the second housing part and at least part of the end surface of the second housing part.

13. A connector comprising:
   a canted coil spring;
   a multi-piece housing comprising:
      a first housing part;
      a second housing part connected to the first housing part without being press fit to the first housing part, the first housing part and the second housing part defining a housing bore having a lengthwise housing axis;
   a groove formed in the housing bore by the connection of the first housing part with the second housing part and having at least a portion of the canted coil spring disposed therein;
   an insert element inserted into the housing bore and contacting the canted coil spring to connect with the housing; and
   a generally planar exterior end surface having an opening formed therein leading to the housing bore of the multi-piece housing abutting a generally planar surface located on the insert element to limit insertion travel of the insert element into the housing bore.

14. The connector of claim 13, wherein at least a portion of the groove and at least a portion of the insert element contacting the canted coil spring are electrically conductive, and wherein the canted coil spring electrically connects the housing with the insert element.

15. The connector of claim 13, wherein the insert element comprises a groove receiving at least a portion of the canted coil spring.

16. The connector of claim 13, wherein the first and second housing parts are connected together by bending a portion of the first housing part to engage an exterior surface of the second housing part or by bending a portion of the second housing part to engage an exterior surface of the first housing part.

17. The connector of claim 13, wherein the first and second housing parts are connected together by welding.

18. The connector of claim 13, wherein the first and second housing parts are connected by a projection of the first housing part or the second housing part engaging a depression of the other housing part.

19. The connector of claim 13, wherein the first and second housing parts are connected by a threaded section of the first housing part engaging a threaded section of the second housing part.

20. The method of claim 13, wherein the first housing part or the second housing part is an insert element having a flange and an active end.

21. The connector of claim 13, wherein the groove has a tapered, non-perpendicular, wall relative to the lengthwise housing axis.

22. The connector of claim 13, wherein the groove is a V-groove.

23. The connector of claim 13, further comprising a conductive liner positioned, at least in part, in the groove and in contact with the canted coil spring.

24. The connector of claim 13, wherein the first and second housing parts are threadedly engaged to one another and wherein the first housing part, the second housing part, or both the first and the second housing parts include or includes a crimped portion.

25. The connector of claim 13, further comprising a vent port in communication with the housing bore.

26. The connector of claim 13, wherein the first housing part or the second housing part comprises a tapered wall defining a bottom wall and a sidewall that is generally orthogonal to the lengthwise housing axis.

27. The connector of claim 13, wherein the first housing part or the second housing part comprises a connection port having at least one wire positioned therein for conducting electricity to or from the canted coil spring.

28. The connector of claim 13, wherein the second housing part has an exterior surface and an end surface and wherein the first housing part overlaps all of the exterior surface of the second housing part and at least part of the end surface of the second housing part.

29. A method for assembling a connector comprising:
   connecting a first housing part and a second housing part together to form a multi-piece housing by mechanically inter-engaging at least one part of the first housing part to at least one part of the second housing part, the connecting of the first housing part and the second housing part forming a housing bore and a groove in the housing bore;
   placing at least a portion of a canted coil spring into the groove;
   inserting an insert element into the housing bore, the insert element contacting the canted coil spring to connect to the housing; and
   wherein the groove of the multi-piece housing comprises a tapered wall or a generally planar exterior end surface having an opening formed therein leading to the housing bore of the multi-piece housing configured to abut a generally planar surface located on the insert element to limit insertion travel of the insert element into the housing bore.

30. The method of claim 29, further comprising coating the first housing part, the second housing part, or both the first and the second housing parts with a conductive material before mechanically engaging the first and the second housing parts together.

31. The method of claim 29, wherein connecting the housing parts comprises bending a portion of the first housing part to engage an exterior surface of the second housing part or bending a portion of the second housing part to engage an exterior surface of the first housing part.

32. The method of claim 29, wherein the first housing part, the second housing part, or both the first and the second housing parts include a wire terminal.

33. The method of claim 29, wherein connecting the housing parts comprises a projection of the first housing part or the second housing part engaging a depression of the other housing part.

34. The method of claim 29, wherein connecting the housing parts comprises connecting a threaded section of the first housing part to a threaded section of the second housing part.

35. The method of claim 29, wherein the insert element comprises a first outside diameter and a second outside diameter defining a generally planar surface; and wherein the generally planar surface on the insert element abuts the generally planar exterior end surface on the multi-piece housing.

36. The method of claim 29, further comprising placing a conductive liner inside the first housing part or the second housing part before mechanically inter-engaging the first and second housing parts together.

37. The method of claim 29, further comprising a second tapered sidewall forming a V-groove.

38. The method of claim 29, wherein the multi-piece housing defines a lengthwise housing axis and wherein the groove further comprises a sidewall extending from the tapered wall, said sidewall being generally orthogonal to the lengthwise housing axis.

39. The method of claim 29, wherein the first housing part or the second housing part comprises a connection port having at least one wire positioned therein for conducting electricity to or from the canted coil spring.

40. The method of claim 29, wherein the first housing part has an outside diameter and the second housing part has an outside diameter, and wherein the two outside diameters are about equal.

41. The method of claim 29, wherein the second housing part has an exterior surface and an end surface and wherein the first housing part overlaps all of the exterior surface of the second housing part and at least part of the end surface of the second housing part.

* * * * *

UNITED STATES PATENT AND TRADEMARK OFFICE
CERTIFICATE OF CORRECTION

PATENT NO. : 8,382,532 B2
APPLICATION NO. : 13/105628
DATED : February 26, 2013
INVENTOR(S) : Sjostedt et al.

It is certified that error appears in the above-identified patent and that said Letters Patent is hereby corrected as shown below:

In the Specifications

In column 2, line 1, delete "east" and insert -- least --, therefor.

In column 3, line 42, delete "according," and insert -- according --, therefor.

In column 4, line 48, delete "a the" and insert -- the --, therefor.

In column 7, line 15, delete "(polysuphone)," and insert -- (polysulfone), --, therefor.

In column 11, line 50, delete "that that" and insert -- that --, therefor.

In column 14, line 64, delete "welded." and insert -- welded, --, therefor.

In the Claims

In column 29, line 5, in claim 3, delete "fiat" and insert -- flat --, therefor.

In column 29, line 8, in claim 4, delete "fiat" and insert -- flat --, therefor.

In column 30, line 21, in claim 20, delete "method" and insert -- connector --, therefor.

Signed and Sealed this
Seventh Day of January, 2014

Margaret A. Focarino
*Commissioner for Patents of the United States Patent and Trademark Office*